(12) United States Patent
Rau

(10) Patent No.: US 6,679,702 B1
(45) Date of Patent: Jan. 20, 2004

(54) VEHICLE-BASED HEADWAY DISTANCE TRAINING SYSTEM

(76) Inventor: Paul S. Rau, 10709 Faulkner Ridge Cir., Columbia, MD (US) 21044

( * ) Notice: Subject to any disclaimer, the term of this patent is extended or adjusted under 35 U.S.C. 154(b) by 199 days.

(21) Appl. No.: 10/020,234

(22) Filed: Dec. 18, 2001

(51) Int. Cl.$^7$ .............................. G09B 9/00; G09B 19/16
(52) U.S. Cl. .............................. 434/29; 434/62; 434/64; 434/305; 340/435; 342/70; 701/301
(58) Field of Search ..................... 434/29, 62, 64–66, 434/305, 365; 340/435, 436, 901, 903, 904; 342/70, 71, 159, 188, 193; 701/301, 96; 363/37; 707/1; 180/167–169

(56) References Cited

U.S. PATENT DOCUMENTS

| | | | |
|---|---|---|---|
| 3,710,383 A | 1/1973 | Cherry et al. | |
| 3,781,879 A | * 12/1973 | Staras et al. | ................. 342/159 |
| 3,885,324 A | 5/1975 | Davenport et al. | |
| 3,916,534 A | 11/1975 | Riccio | |
| 4,003,049 A | 1/1977 | Sterzer et al. | |
| 4,623,966 A | 11/1986 | O'Sullivan | |
| 4,641,136 A | 2/1987 | Kowalczyk | |
| 4,673,937 A | 6/1987 | Davis | |
| 4,833,469 A | 5/1989 | David | |
| 5,091,726 A | 2/1992 | Shyu | |
| 5,235,316 A | 8/1993 | Qualizza | |
| 5,249,157 A | 9/1993 | Taylor | |
| 5,357,438 A | 10/1994 | Davidian | |
| 5,369,561 A | * 11/1994 | McCullough | ................. 363/37 |
| 5,388,048 A | 2/1995 | Yavnayi et al. | |
| 5,420,792 A | 5/1995 | Butsuen et al. | |
| 5,432,509 A | 7/1995 | Kajiwara | |
| 5,436,835 A | 7/1995 | Emry | |
| 5,459,460 A | 10/1995 | Nishino | |
| 5,465,079 A | 11/1995 | Bouchard et al. | |
| 5,467,283 A | 11/1995 | Butsuen et al. | |
| 5,471,214 A | 11/1995 | Faibish et al. | |
| 5,529,138 A | 6/1996 | Shaw et al. | |
| 5,594,412 A | 1/1997 | Matsumoto | |
| 5,594,414 A | 1/1997 | Namngani | |
| 5,631,639 A | 5/1997 | Hibino et al. | |
| 5,635,922 A | 6/1997 | Cho et al. | |
| 5,646,612 A | 7/1997 | Byon | |
| 6,002,983 A | * 12/1999 | Alland et al. | ................. 701/301 |
| 6,289,332 B2 | * 9/2001 | Menig et al. | ................. 707/1 |
| 6,363,311 B1 | * 3/2002 | Kuroda et al. | ................. 701/96 |
| 2003/0016161 A1 | * 1/2003 | Okai et al. | ................. 342/70 |

* cited by examiner

Primary Examiner—Joe H. Cheng
(74) Attorney, Agent, or Firm—Rosenberg, Klein & Lee

(57) ABSTRACT

A vehicle-based headway collision avoidance training system (300) is provided that includes a sensor system (350) mounted to the training vehicle (200), a processing system (330), and an interface unit (340) coupled to the vehicle's wiring. The combination of processing system (330), a graphical display (332), a data input device (334), and an audio output device (336) provides a collection of special auditory and visual displays attended to by the student, and controls and displays used by the instructor that are unique for teaching headway safety in the context of a moving vehicle.

20 Claims, 24 Drawing Sheets

MEASURES

127 — STATUS

| | |
|---|---|
| Headway Distance (ft) | 98 |
| Student Speed (mph) | 47 |
| Lead V. Speed (mph) | 38 |

129, 131, 133

CROSSINGS  [Reset]

| | |
|---|---|
| Headway Rule | 3 — 138 |
| Time to Collision | 5 — 140 |
| Maximun Speed Limit | 7 — 141 |
| Minimum Distance | 4 — 143 |

VEHICLE-BASED HEADWAY DISTANCE TRAINING SYSTEM

BACKGROUND OF THE INVENTION

1. Field of the Invention

This invention relates to a vehicle-based headway collision avoidance trainer. The invention is particularly useful for instructing student drivers to maintain safe following distances behind other motor vehicles while the student is behind the wheel of an ordinary driver education vehicle. The combined effects of driver, vehicle, and roadway factors determine safe following distances according to physical laws, which are not intuitive and not easily separable in everyday driving. For example, slow student reaction-time, hard-braking by a leading-vehicle, and wet roadways, require that the student maintain a longer headway distance. In using the trainer, actual or simulated driver, vehicle, and roadway conditions are independently selectable by the driving instructor, the combination of which is used to compute a danger of headway collision distance. According to the present invention, unique instructional auditory and visual displays are attended by the student driver, and controls and displays are used by the instructor, which are specifically intended for teaching headway safety in the environment of a moving vehicle.

According to the National Highway Traffic Safety Administration, rear-end collisions are a leading cause of injury, death, and loss of property. Rear-end crashes involving passenger-vehicles was the second leading crash type in 1993, representing 26% of all crashes. For single-unit and combination-unit trucks, the rear-end collision was the most prevalent of all specific crash categories, representing 26% and 19% of all crashes, respectively. However, younger drivers are the highest risk group. Motor vehicle crashes are the leading case of death for drivers 15 to 20 years of age. Drivers 15 to 19 years of age were nearly three times more likely to strike another vehicle, and nearly twice as likely to be struck. The challenge for drivers is that traffic density has increased and there are greater numbers of commercial trucks and sport utility vehicles on roadways. Large vehicles can block the view of traffic ahead of the large vehicle, ordinarily used to maintain a safe distance. In this regard, the present invention can help reduce rear-end crashes by providing an in-vehicle environment for students to acquire the knowledge and learn behaviors that result in safe following distances.

2. Prior Art

Collision avoidance training technology has been limited to desktop video-based driving simulators, expensive research simulators, and instructional media. In previous research reported in *Commercial Motor Vehicle Simulation Technology To Improve Driver Training, Testing and Licensing Methods* FHWA-MC-96-003 Final Report, April (1966), driver training experts were asked to rate the importance of various simulator training objectives. Following-distance was rated nearly equal to that of driving forward, and was rated the 7th most important objective of 23 in simulator training. However, whereas, all evaluated simulators were judged as adequate in teaching forward driving skills, following-distance was judged as adequate in only 6 of the 12 simulators reviewed. Furthermore, only one of these 6 was manufactured in the U.S., a high fidelity full mission simulator valued at $900,000. Other U.S. built systems were rated as "not-adequate" or "not-provided" with regard to teaching following-distance. These systems were low-fidelity or mid-level fidelity part-task simulators and cost as much as $250,000. The failure of even the most expensive simulators to teach safe following distance is the shortfall of reproducing the visual cues required for judging distance.

SUMMARY OF THE INVENTION

The object of the present invention is to provide accurate instructional feedback to student drivers on maintaining safe following distances, under actual or simulated driver, roadway, and traffic conditions, with the student behind the wheel of an ordinary driving education vehicle.

It is a further object of the invention to provide unique auditory and visual displays for the student driver, and controls and displays for the driving instructor specifically intended for teaching headway safety in the environment of a moving vehicle.

According to the present invention, there is provided a vehicle-based headway collision avoidance trainer for the purpose of training student drivers to maintain safe following distances behind other motor vehicles. Unlike other known means of headway distance training, the present invention is intended for use by driving educators in the environment of an ordinary training vehicle while the student driver operates the motor vehicle in response to actual or simulated driver, roadway and traffic conditions. There is provided an integrated collection of special auditory and visual displays attended to by the student, and controls and displays used by the instructor that are unique for teaching headway safety in the context of a moving vehicle. The invention pertains to educating student drivers of passenger vehicles, trucks, busses, and other vehicles, but also pertains to drivers that require driving rehabilitation, training elderly drivers to adjust to losses in perceptual judgement, teaching advanced driving skills, and special driving skills used in law enforcement.

Further, according to the present invention, there is a vehicle-based headway collision avoidance trainer comprising: means for measuring the distance between the training vehicle and a second vehicle traveling in the forward path of the training vehicle; means for measuring the speed and direction of the training vehicle; means for sensing student braking; means for sensing turn-signal activation; means for measuring the reaction-time of the student driver; means for sensing roadway topography and temperature; a computer for receiving a number of parameters, from said sensing means, and for computing from these and other parameters the speed and direction of the leading vehicle, the stopping time of the training vehicle and leading vehicle, and the danger-of-headway-collision; auditory and visual training displays and warnings actuated by the computer when the danger-of-headway-collision distance is computed; and controls for setting other parameters, which are used by the instructor for teaching headway safety in the context of a moving vehicle.

According to further features of the preferred embodiments, below, the trainer includes a main control panel for selecting one of three instructional displays and one of three instructional methods. One display and one method are continuously visible. Thus, a total of nine pairs of display and method combinations are selectable, and each combination provides for the unique visualization of the training environment and control of the training experience. It is an advantage of the present invention that 1) the combinations of displays and methods are easily selectable by the instructor in a moving vehicle, and 2) the instructor is not distracted by a complex user interface. In other embodiments, additional or other displays and methods may be selectable from the main panel. It is also an advantage of the main control panel that although separate instructional displays may be selected, there is a permanent visual display of the danger of headway collision, an indicator for showing the data processing state of the trainer, and controls for setting conditions for limiting sensor data processing.

According to another feature of the preferred embodiments, below, the trainer includes a danger of headway collision display on the main control panel, which is continuously visible and particularly useful for teaching headway safety in the environment of a moving vehicle. According to one embodiment, the display is a horizontal bar graph, which increases in value from left to right. There are two independent scales. Each scale uses the entire area of the bar graph. The first scale could be colored light red and shows the level of increasing danger up to the following distance where a headway collision would be imminent. After the color of the first scale fills the bar graph, and the distance between vehicles closes further, the display is cleared and the second scale begins again from the left. The second scale could be colored dark red and shows the level of increasing danger that exceeds the minimum recommended following distance. The display is particularly useful for teaching headway safety in the environment of a moving vehicle because it provides 1) permanent means of visual feedback to the student that is intuitive and non-distracting, 2) two separate levels of managing headway distance, prior to imminent danger and within the danger "zone", and 3) redundant visual indication of computer generated auditory and instructional speech feedback.

According to still further features of the preferred embodiments, below, the trainer includes a settings control on the main control panel, which is useful for limiting sensor data processed by the computer. Limiting the sensor data processed by the computer is particularly useful for teaching headway safety in the environment of a moving vehicle because 1) non-accurate or inappropriate training feedback can distract and confuse the student, and 2) some sensors require calibration for providing accurate measurements. Regarding the distance measuring sensor, the instructor can select target vehicles within a specified range, calibrate sensor input to reference all distance measures from the front bumper of the training vehicle (if the sensor is located elsewhere on the vehicle), and disable instructional audio and visual feedback until a selected time expires following a full stop and/or after the training vehicle attains a specified speed. It is an advantage of the present invention that the latter selected delays in processing eliminate annoying alarms that may occur during irregular distances and speeds during traffic startup, and/or while driving at lower speeds. With regard to ensuring the accuracy of the speed measurement, there is also a control for calibrating the computed speed measurement with the actual speed of the training vehicle.

According to still another feature of the settings control on the main control panel, there are controls for setting computer generated speech feedback and auditory alarms. Auditory feedback is particularly useful for teaching headway safety in the environment of a moving vehicle because it 1) enables the driver to maintain eyes on the road, and 2) facilitates learning by the student comparing observations of the headway environment with the instructional feedback from the trainer regarding that environment. Feedback includes verbal instruction based on measured trends in student driving performance, and provides remarks to the student regarding their performance. There may be a variety of style and content in verbal feedback, including the use of humor, sarcasm, and different voices. Verbal feedback may be provided through the computer in the form of digitally recorded comments or synthetic speech. Additional auditory features of the present invention include tonal alarms that indicate the moment to moment danger of a headway collision, the operational state of the trainer, violations of selected speed and distance limits, and naming of a function when that function is selected.

According to another feature of the preferred embodiments, below, the trainer includes a simulation method selected on the main control panel which is useful for reproducing the conditions of driver reaction time, braking behavior, and roadway conditions. The simulate method is particularly useful for teaching headway safety in the environment of a moving vehicle because 1) the instructor can change settings to mirror actual driving conditions or to illustrate the separate or combined effects of extreme conditions; for example, slow student reaction time and expected hard braking by the leading vehicle driver would result in a headway warning issued at a farther following distance, than if the student reaction time were faster and the expected leading vehicle braking force were softer, and 2) the student is able to form better judgements about maintaining safe following distances by understanding the effect of conditions on the physical capability of the vehicle to stop. From the selections and measures using the simulation method, when applied to the current distance and vehicle speeds, the resulting danger of headway collision is displayed by the danger-of-headway-collision bar graph on the main control panel, as well as on the time-to-collision graph on the history display.

According to a further feature of the simulation method, the instructor can demonstrate the effects of student reaction time by either selecting one of several reaction times from a list or by implementing real-time student reaction time tests. The selection or measurement of student reaction time is particularly useful for teaching headway safety in the environment of a moving vehicle because longer delays in driver braking responses can greatly lengthen the safe following distance. It is an advantage of the present invention that there are three methods for measuring student reaction time. The first is implemented using the instructors computer, whereby the student uses the trainer interface to respond to randomly presented signals. The second method requires the student to initiate a brake pedal response to signals randomly presented by the trainer. The third method measures real time student braking delays in response to the danger of headway collision warning.

According to a further feature of the simulation method, the instructor can demonstrate the effects of driver braking force by separately selecting deceleration rates for the leading vehicle and training vehicle. The simulation of expected braking force by drivers is particularly useful for teaching headway safety in the environment of a moving vehicle because expected braking force can greatly lengthen the danger of headway collision distance. However, the effects of braking force by each driver has an opposite effect on the requirement to increase or decrease following distance. It is an advantage of the present invention that a unique display is provided to illustrate the counterintuitive relationship. For example, whereas, expected hard braking by the leading driver would result in a warning to increase headway distance because a shorter stopping distance is expected, softer braking by the student driver would also result in a longer headway because a longer stopping distance is expected.

According to still another feature of the simulation method, the instructor can demonstrate the effects of roadway conditions by separately selecting roadway, traffic, and vehicle conditions. The simulation of roadway, traffic, and vehicle conditions is particularly useful for teaching headway safety in the environment of a moving vehicle because risky roadway conditions can greatly lengthen the danger of headway collision distance. The instructor can select the road condition as wet or dry, and road visibility as ok or poor; traffic density as low or high, and braking speed as slow or fast; and the leading vehicle as a car or truck, and the training vehicle weight as normal or heavy. The risk condition selection is highlighted, and each risk causes a cumulative time penalty in computing the danger of headway collision. The time penalty results in a headway warning that occurs at a greater following distance. It will be appreciated that other or additional roadway conditions may be selectable in other embodiments, and other means of increasing headway from risk factors may be implemented.

According to still further features of the preferred embodiments, below, the trainer includes a limit-alarms method control on the main control panel, which is useful for the instructor to select safe driving limits for the student driver. Driving limits include the minimum following distance between the training vehicle and a leading vehicle, the minimum following time "rule", e.g. two-second rule (below), and the maximum speed the student may travel. It will be appreciated that other embodiments of the present invention may include other or additional limits. The limit alarms control is particularly useful for teaching headway safety in the environment of a moving vehicle because it provides a means for the student to learn to maintain safe following distances within fixed limits. Whereas, the simulation method teaches the student to anticipate and judge the driver, braking, and roadway factors that require different following distances, the limit alarms method is more intuitive. However, the limit alarms method of headway training can provide an introductory experience using the trainer, prior to learning more complex collision avoidance concepts using the simulation method.

According to a further feature of the preferred embodiments, below, the trainer includes a following-time rule or "range rate" method selected on the main control panel, which is useful for instructing the student according to traditional training concepts. For example, a two-second following "rule" involves a two-second count from the time the leading vehicle passes a roadside landmark until the landmark reaches the following vehicle. The following-time method provides a general rule of thumb for maintaining distance. Following time or range rate is simply the amount of time it takes for the training vehicle to traverse the distance to the leading vehicle. Unlike the simulation method, the following time method does not provide first hand experience about the separate and combined effects of driver, roadway, and traffic conditions. According to the features of the following-time method, the preferred embodiments include the automatic measurement of the headway distance, a means for the instructor to select one of several following times, and a means to graphically monitor student history in maintaining a selected following time. It is an advantage of the present invention that the student receives verbal feedback from the computer, based on performance history, when the measured following time is less than the desired following time.

According to still further features of the preferred embodiments, below, the trainer includes a geometry display selected from the main control panel, which is useful for indicating the relative motion of the leading vehicle with respect to the training vehicle. The geometry display is particularly useful for teaching headway safety in the environment of a moving vehicle because the student can be alerted to conditions where the motion of the leading vehicle will 1) result in a head-on collision, 2) is stationary in front of the training vehicle, 3) just cut in front of the training vehicle, or 4) is traveling normally in the forward path of the training vehicle. It will be appreciated that additional or other motion geometries may be sensed in other embodiments. It is also an advantage of the invention that when the geometry is detected, the sensed motion of the leading vehicle is verbally announced by the trainer. Therefore, the student can verify and learn through observation of the forward scene, when certain geometries present a danger of headway collision. Lastly, in some embodiments the student braking responses to motion geometries is used to automatically compute the student's reaction time.

According to still another feature of the preferred embodiments, below, the trainer includes a time-to-collision "history" display selected from the main control panel. The time-to-collision display is useful for teaching headway safety in the environment of a moving vehicle because the time-to-collision measure is the danger-of-headway-collision computed directly from the driver, roadway, and vehicle conditions selected and measured using the simulation method. The history display is particularly useful for graphically showing the measurement and history of the student maintaining a safe headway distance. In addition, the time-to-collision measurement is the value continuously displayed by the danger-of-headway-collision bar graph on the main control panel. It is an advantage of the present invention that the content of verbal feedback by the computer to the student is based on the trends the computer detects in the history of the time-to-collision measurement. Whereas, verbal feedback and alarms from other displays and methods that comprise the trainer are active only when that display or method is selected, the verbal feedback regarding the time-to-collision history and danger of headway collision is constantly enabled.

According to a further feature of the preferred embodiments, below, the trainer includes a measurements display selected from the main control panel, which is useful for providing a moment to moment numerical display of training vehicle and leading vehicle speeds, the distance between the vehicles, and summary measures of student performance. The measurements display is particularly useful for teaching headway safety in the environment of a moving vehicle because the measures provide the instructor with information about student progress. Specifically, the cumulative number of violations or exceeded limits are displayed, e.g. following-time rule, speed, distance, and time-to-collision. It will be appreciated that other performance measures may be used or included in other embodiments of the invention.

According to still another feature of the preferred embodiments, below, included is the means for improving the safe use of the headway trainer. First, the student should not be distracted by auditory feedback while the student is engaged in certain traffic maneuvers, e.g. lane change, merging, braking, turning. It is an advantage of safe operation that the trainer tests for braking and the activation of a turn signal, which indicates that the student is maneuvering the vehicle. Second, it is an advantage of safe operation that the trainer tests for a line-of sight condition. Some line-of-sight sensors, e.g. laser radar, can return false measurements from roadside objects that are detected while the student negotiates a curve. Therefore, the trainer senses a change in heading, which may result in a false alarm. Third, it is an advantage of safe operation that the trainer automatically senses roadway topography and temperature for the purpose of presetting deceleration rates and/or time penalties. For example, roadway pitch angle may be used to automatically increase the following distance when traveling downhill.

Further features and advantages will be apparent from the description below.

BRIEF DESCRIPTION OF THE DRAWINGS

FIG. 13 illustrates the display of basic measures of the present invention.

DESCRIPTION OF PREFERRED EMBODIMENTS

A vehicle-based headway distance training system 300, according to the present invention, will be described while referring to FIGS. 1–14. With a student behind the wheel of a motor vehicle, training system 300 is intended for use by a driver education instructor to teach safe following distances behind other motor vehicles. While driving in traffic, training system 300 provides moment to moment auditory and visual instruction to student drivers about the safety of their present distance keeping behavior and their performance over time. The content of instructional feedback to the student depends on settings selected by the instructor to change the simulated or actual conditions related to the drivers, roadway, and traffic. Through use of the present invention, the student driver will be compelled to adjust their following distance, as they drive, in accordance with the multiplicity of conditions selected by the driving instructor. Thus, a unique method of teaching headway safety is provided by use of the present invention, where training is accomplished in the context of a moving vehicle.

Figure 1:
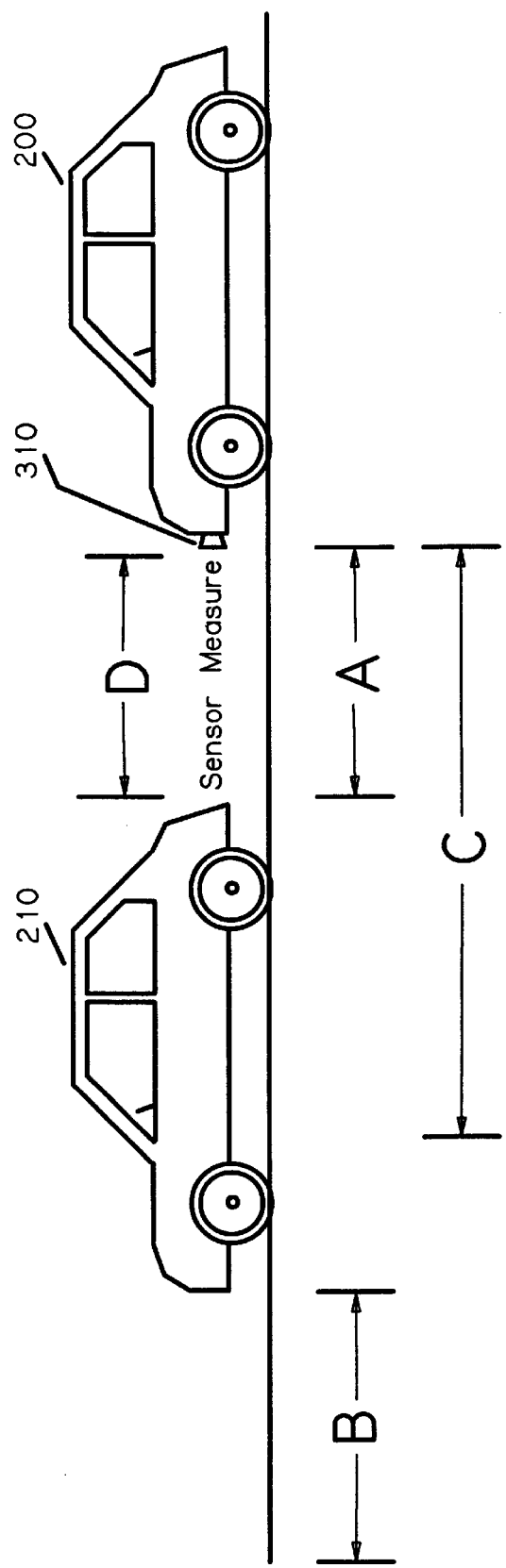
FIG. 1 illustrates the component times and distance involving the training-vehicle and a leading-vehicle, used to compute the danger of headway collision in the present invention.

FIG. 1 illustrates the basic elements of measurement to compute the danger of headway collision warning. In FIG. 1, time A is the "following time" or time for the training vehicle to traverse the distance between the training vehicle 200 and leading vehicle 210. Time B is the stopping time of the leading vehicle 210, time C is the stopping time of the training vehicle 200, and D is the measured distance, established by the distance sensor 310, between the leading vehicle 210 and training vehicle 200. The combination of following time A and leading vehicle stopping time B is the total time within which the training vehicle must stop to avoid a collision, i.e. "headway time". If the training vehicle stopping time C, i.e. "collision time", is longer than the "headway time", then a headway collision is imminent if the leading vehicle 210 would suddenly brake to stop. As will be discussed in following paragraphs, the measurement of the distance between respective vehicles is used in combination with the training vehicle speed to compute the speed and stopping distance of the leading vehicle 210. When assumptions about driver reaction time (FIGS. 3 and 4), braking behavior (FIG. 3), and roadway conditions (FIG. 5) are combined in the computation to determine stopping times B and C, training system 300 is able to compute the relative motion between the respective vehicles 200, 210, and issue instructional feedback to the student regarding the danger of a headway collision.

Figure 2A:
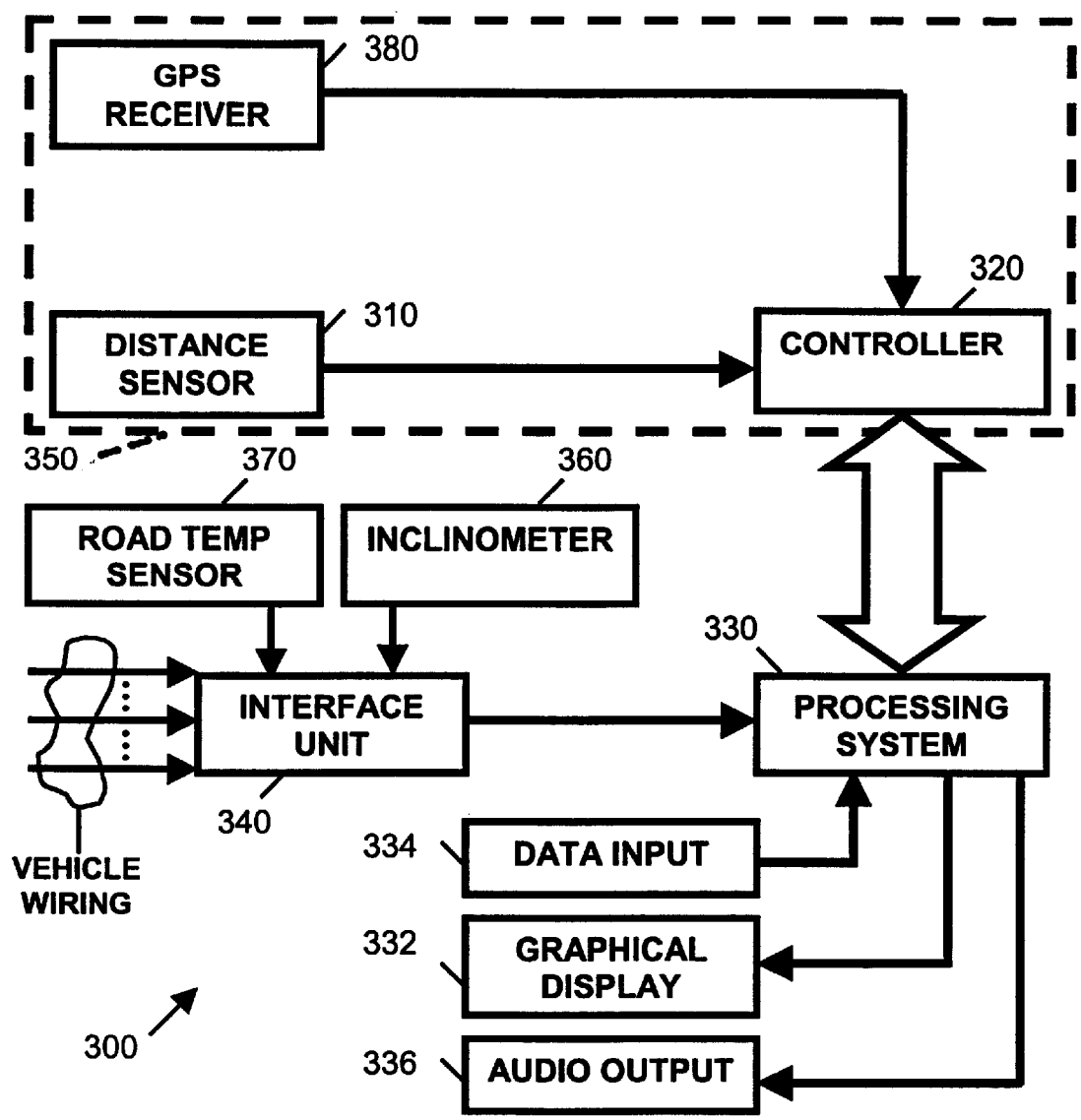
FIG. 2A is a block diagram of the present invention showing one configuration of sensors.

Referring now to FIG. 2A, there is shown a block diagram of vehicle-based headway distance training system 300. System 300 includes a sensor system 350 coupled to a processing system 330 for transfer of data and control signals therebetween. The processing system 330 provides an output to a graphical display 332 and receives input data from an input device(s) 334. The data input device 334 my include a keyboard and/or a mouse, trackball, graphics tablets or other position sensitive input device. The processing system 330 also provides an output to an audio output device 334. Audio output device 334 may provide both alarm tones and voice output as warning and feedback to the student. Processing system 330 may be coupled to an interface unit 340 for receiving data and status signals from the training vehicle's wiring. For example, interface unit 340 may be used to detect operation of the vehicle's brake and/or turn signals and translate those signals to the appropriate levels for input to processing system 330, such as providing a contact closure for coupling to a game port of a personal computer. Interface unit 340 may convert the analog status signals to digital signals coupled serially or in parallel to processing system 330. Interface unit 340 may also detect speed signals from the vehicle's speed sensor or one added to the vehicle for exclusive use by system 300. Other sensors, such as inclinometer 360 and/or roadway temperature sensor 370, optionally added to the training vehicle can also be coupled to processing system 330 through interface unit 340, or if they provide digital output may be directly coupled to processing system 330.

Sensor system 350 includes a distance sensor 310 that continuously measures the distance between the sensor 310 and an object or vehicle in front of the sensor. Sensor 310 is coupled to a controller 320, and controller 320 communicates with processing system 330 to transfer the distance measurements of sensor 310 periodically thereto. The distance measuring sensor 310 may be any system that provides a measurement of distance D, shown in FIG. 1. Conventional distance measuring devices include pulse-Doppler radar, laser radar, ultrasound, or video imaging systems.

Inter-vehicle communications combined with Global Positioning System (GPS) receivers may also be used to provide the headway distance measurement, distance D. With the conventional devices, the forward looking sensor is aligned to sense signals that the sensor emits, e.g. radio frequency, photonic, or ultrasonic, which are reflected from a surface of the leading-vehicle or obstruction. Distance is measured as a function of the time-of-flight of these signals from their emission to their return detection by the sensor. A preferred location for sensor 310, for a passenger vehicle, is in proximity of the front license plate mounting area of the training vehicle. Other locations, such as the dash board of the training-vehicle, can also be utilized. In one working embodiment, sensor 310 was a time of flight laser ranging kit having the designation ERC-2, available from E-O Devices, LLC. of Atlanta, Ga. In that working embodiment, controller 320 was a PIC processor having the designation BS2-1C, available from Parallax, Inc. of Rocklin, Calif.

To further enhance the accuracy of the danger of collision determination made by system 300, GPS receiver 380 may be included in sensor system 350. GPS receiver 380 provides training vehicle speed, latitude, longitude, azimuth, and heading data to controller 320 for transfer to processing system 330. GPS speed information may be used in addition to or in lieu f other speed sensors connected to interface unit 340. GPS position information may be used to optionally support navigating the training course on a digital map. One use of the heading information is to identify the rate of heading changes, in addition to or lieu of monitoring turn signal operation, in order to inhibit headway related calculations during such heading changes to avoid "false return" information from sensor 310 due to roadside objects that come into the line-of-sight during heading changes, e.g. turns or negotiating curves. In one working embodiment, GPS receiver 380 was an ONCORE, model M12 GPS receiver available from Motorola, Inc. of Chicago, Ill.

Figure 2B:
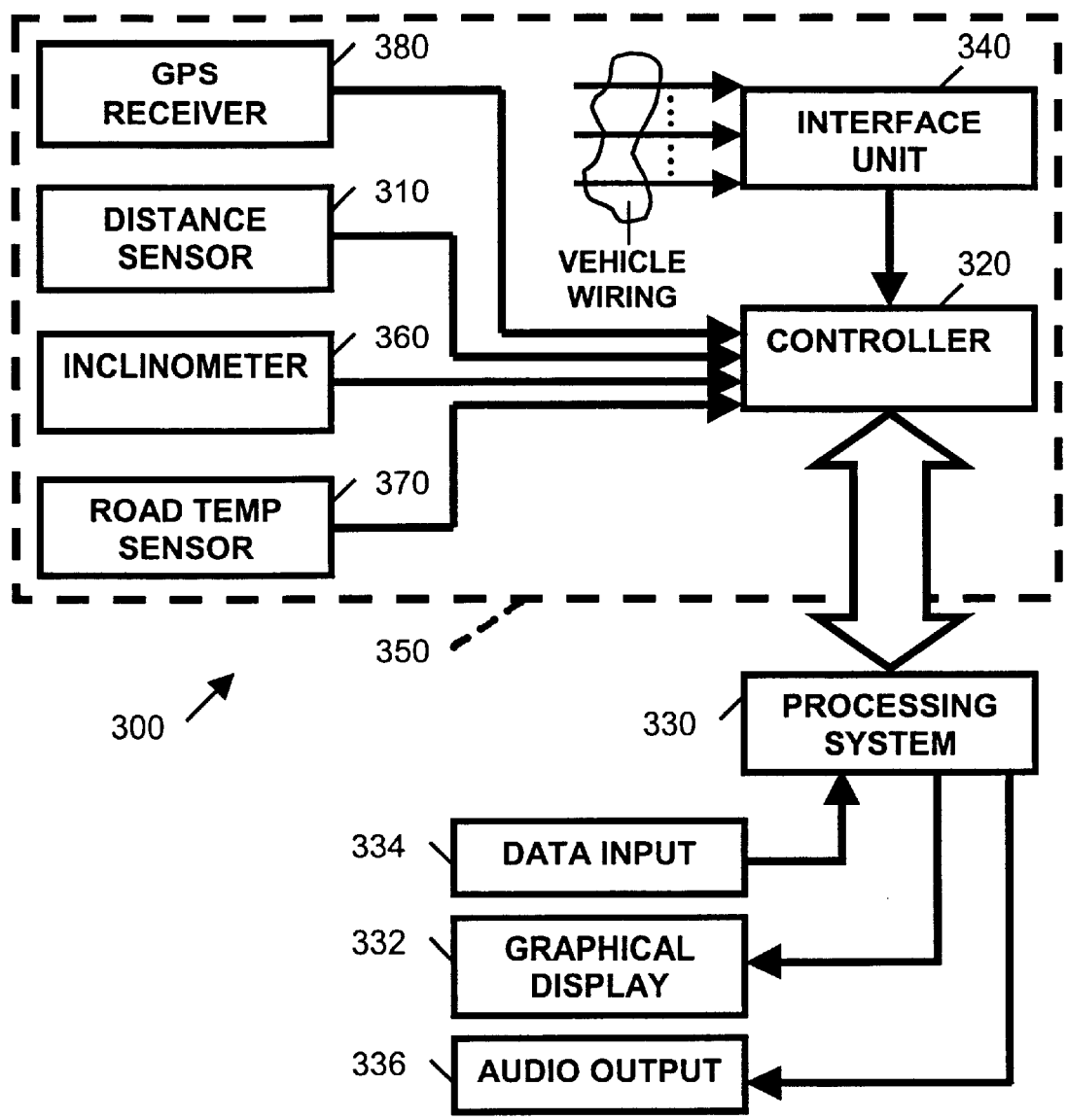
FIG. 2B is a block diagram of the present invention showing an alternate configuration of sensors.

In order to improve the safe operation of the training vehicle, sensors 360 and 370 for measuring roadway topography and temperature, respectively, may also be included in system 330. Inclinometer 360 measures roadway pitch angle and may be used to automatically increase the following distance requirement for the student when traveling downhill. Similarly, roadway temperature sensor 370 may be an infrared temperature measuring device for measuring roadway surface temperatures. The combination of measured low roadway temperatures and the simulated input of wet road conditions would represent the potential for slippery conditions. Such conditions require the student to increase following distance and therefore system 300 automatically adjusts the following distance limits accordingly. As shown in FIG. 2B, inclinometer 360, roadway temperature sensor 340, and interface unit 340 are incorporated into sensor system 350, each being coupled to controller 320 for transfer of data to processing system 330. Alternately, inclinometer 360 and/or roadway temperature sensor 370 may be coupled to processing system 330 through interface unit 340, as shown in FIG. 2A. Sensors 360 and 370 can also be directly connected to a port of processing system 330.

Processing system 330 may be a specialized computer, commercial personal computer or a portable computing device. Commercial portable computers such as laptop, hand-held, pocket PC, palm-size, and auto-PC configurations may be used. Modern portable computers use fast microprocessors and include graphical displays, data entry devices, and audio output means to accomplish the real-time processing of sensor data and user interface functions. In one working embodiment, processing system 330, graphical display 332, data input device 334 and audio output device 336 were embodied in a laptop computer model no. 760E, available from IBM Corp. The data input device 334 may be implemented using touch-screen technology, speech recognition technology, or other point-and-click means of selecting instructional options from graphical display 332. Graphical display 332 should be large enough and located such that the visual instructional content may be easily perceived by the student driver (if desired by the instructor) and such that controls may be easily activated by the driving instructor.

Audible training feedback through the audio output device 336 ensures that the student's eyes are safely on the road and not distracted by observing excessive visual content on computer screens. The audible feedback can include verbal instructions, based on trends in student driving performance, and remarks to the student regarding that performance. Audio output device 336 may be incorporated in the computing device that forms processing system 330. The verbal output may be in the form of digitally recorded comments or synthetic speech. Additionally audio output device 336 provides tonal alarms that indicate the moment to moment danger of a headway collision, the operational state of the trainer, and other alarm conditions. Audio output device 336, whether incorporated into the computing device that forms processing system 330 or as a peripheral thereto, must, in combination with processing system 330, process auditory feedback without slowing sensor data processing or processing that computes the danger of headway collision warning.

Figure 3:
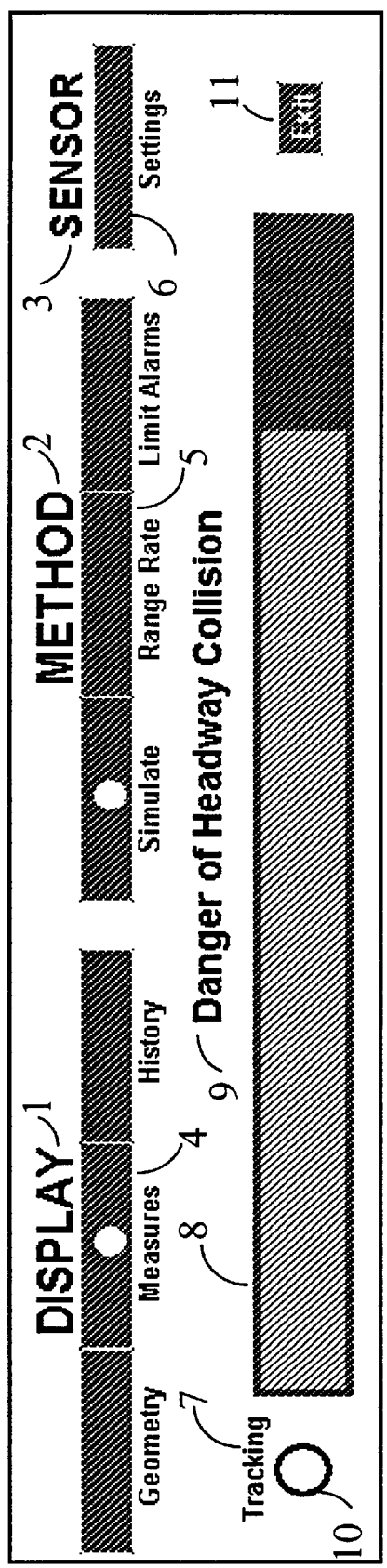
FIG. 3 illustrates the main control panel display of the present invention.

FIG. 3 shows the main control panel display provided on graphical display 332 for selecting the instructional displays and training methods that comprise the headway collision avoidance trainer. The main control panel display is always visible on graphical display 332. From the main control panel display, only one instructional "display" 1 may be selected from control array 4, and only one instructional "method" 2 may be selected from control array 5. The instructional form is displayed on the left side of the display below the main control panel display. The training method form is displayed on the right side of the display below the main control panel display. Only one display form and one method form is visible at the same time. Thus, as there are three choices for each of the display and method forms, there are a total of nine different display and method combinations, each of which provides unique instructional content.

Figure 9:
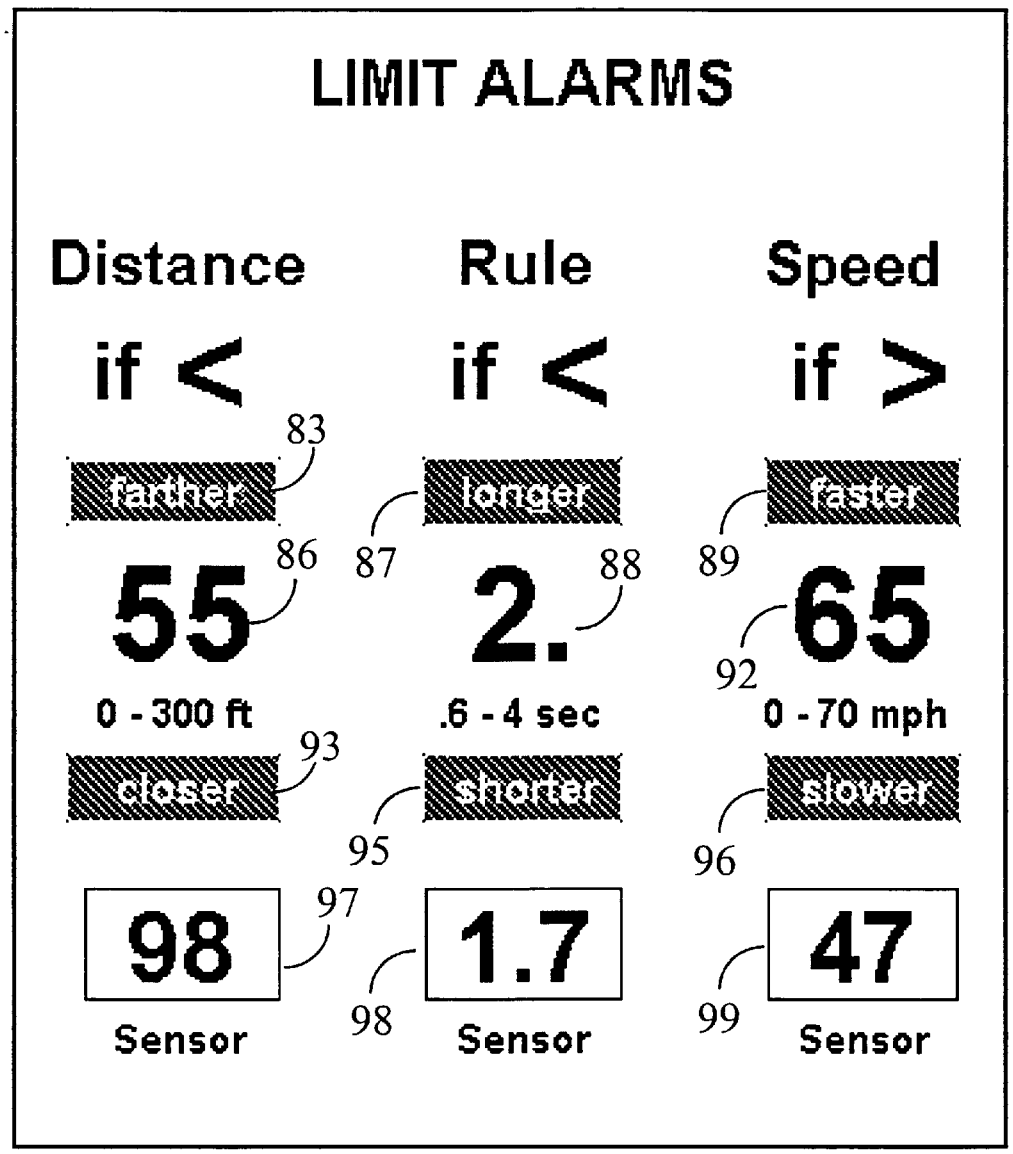
FIG. 9 illustrates the alarm limit form display of the present invention.
Figure 11:
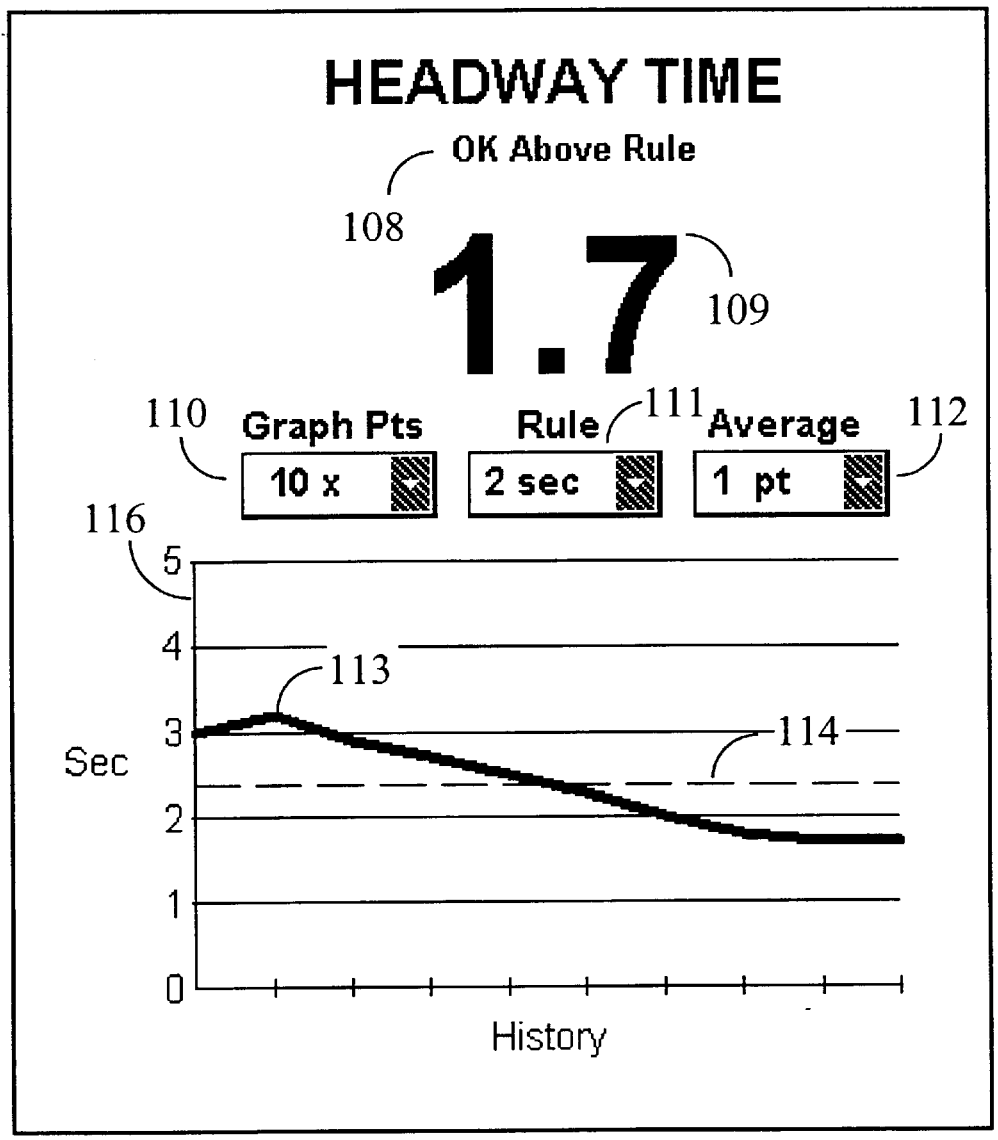
FIG. 11 illustrates the measurement and history of the following-time rule display of the present invention.
Figure 12:
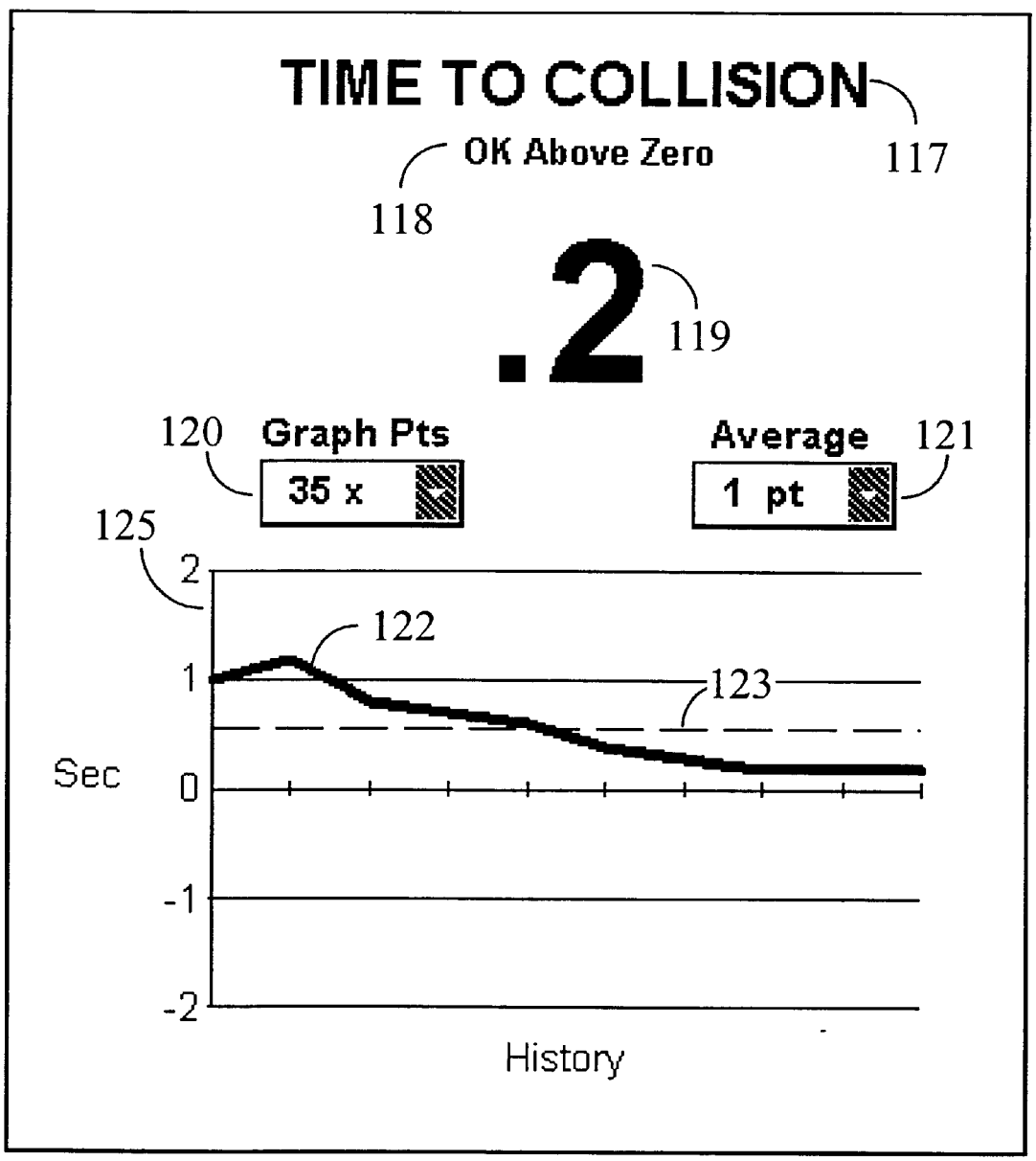
FIG. 12 illustrates the measurement and history of time-to-collision display of the present invention.

Instructional display forms include motion "Geometry" for indicating the relative motion of the leading vehicle with respect to the training vehicle (FIG. 10), performance "Measures" for showing basic sensor measures and student performance scores (FIG. 13), and "History" of the time-to-collision measure for illustrating student training progress (FIG. 12). Training methods include the "Simulation" of driver, roadway, and braking conditions (FIG. 4), following-time rule or "Range Rate" history (FIG. 11), and setting "Limit Alarms" for ensuring 1). minimum following distance, 2). minimum following-time rule or "Range Rate", and 3). maximum training vehicle speed (FIG. 9). It will be appreciated that other instructional displays and training methods may also be added to system 300.

In addition to selecting instructional display forms and training method forms, sensor "Settings" 3 may be selected using pushbutton 6, i.e. by use of a mouse as data input device 334. The settings control provides for setting sensor detection limits, setting options for voice feedback, setting options for audible alarms, setting conditions for rejecting sensor data, and calibrating training vehicle speed. The sensor settings form may be displayed in place of either the instructional display form or the training method form. The selection of any pushbutton on control array 4, 5, or 6 is highlighted by a graphical marking applied to the display of the selected pushbutton. Previously marked controls are then unmarked when a new displayed pushbutton is selected.

Status indicator 10 provides an immediate visual indication of trainer availability. The status indicator "circle" is highlighted when the trainer receives valid sensor data from controller 320. Both the student and instructor need be aware of when the trainer is processing sensor data. Adjacent indicator 10 is a label 7 that provides the current operational status. For example, the content of label 7 changes to show "No Sensor" when data is not available from controller 320, "Paused" when a selected condition for a delay in sensor processing persists, i.e. when the instructor selects a delay on the "Settings" display (FIG. 7), "Searching" when the trainer seeks at least two contiguous sensor inputs, required to continue processing; and "Tracking" when sensor data is contiguous and valid. In order to ensure that the student and instructor are aware of the status of system 300, each new status label is spoken (provided by voice output) through audio output device 336 when the status changes.

The "Danger of Headway Collision" display is a horizontally positioned bar graph 8 identified by a label 9. An increase in danger increments the bar graph from left to right. Bar graph 8 includes two independent scales. Each scale uses the entire area of bar graph 8. The first scale might be colored "light red" and shows the level of increasing headway danger up to the following distance where a headway collision would be imminent. After the color of the first scale fills the bar graph, and the distance between vehicles closes further, the display is cleared and the second scale begins again from the left. The second scale may be colored "dark red" and shows the level of increasing danger as the recommended following distance diminishes. It will be appreciated that there are numerous other concepts for displaying the danger of headway collision. The value used to increment the bar graph is the "time-to-collision" measure from FIG. 12. As the "time to collision" value decreases, the bar graph value increases.

To end a training session, the user selects the displayed "Exit" button 11. Before ending the training session, each trainer setting that was used during that training session is saved in memory that is included in processing system 330. Each student's driving performance record may also be saved in order to measure session-to-session improvement, and for providing the student with a written assessment. When system 300 is reactivated, all previous settings are reinstated for the current training session, along with the performance profile of the student. Therefore, the trainer does not require that the instructor to reconfigure trainer settings for each training session, and provides the means for measuring an individual student's improvement.

Figure 4:
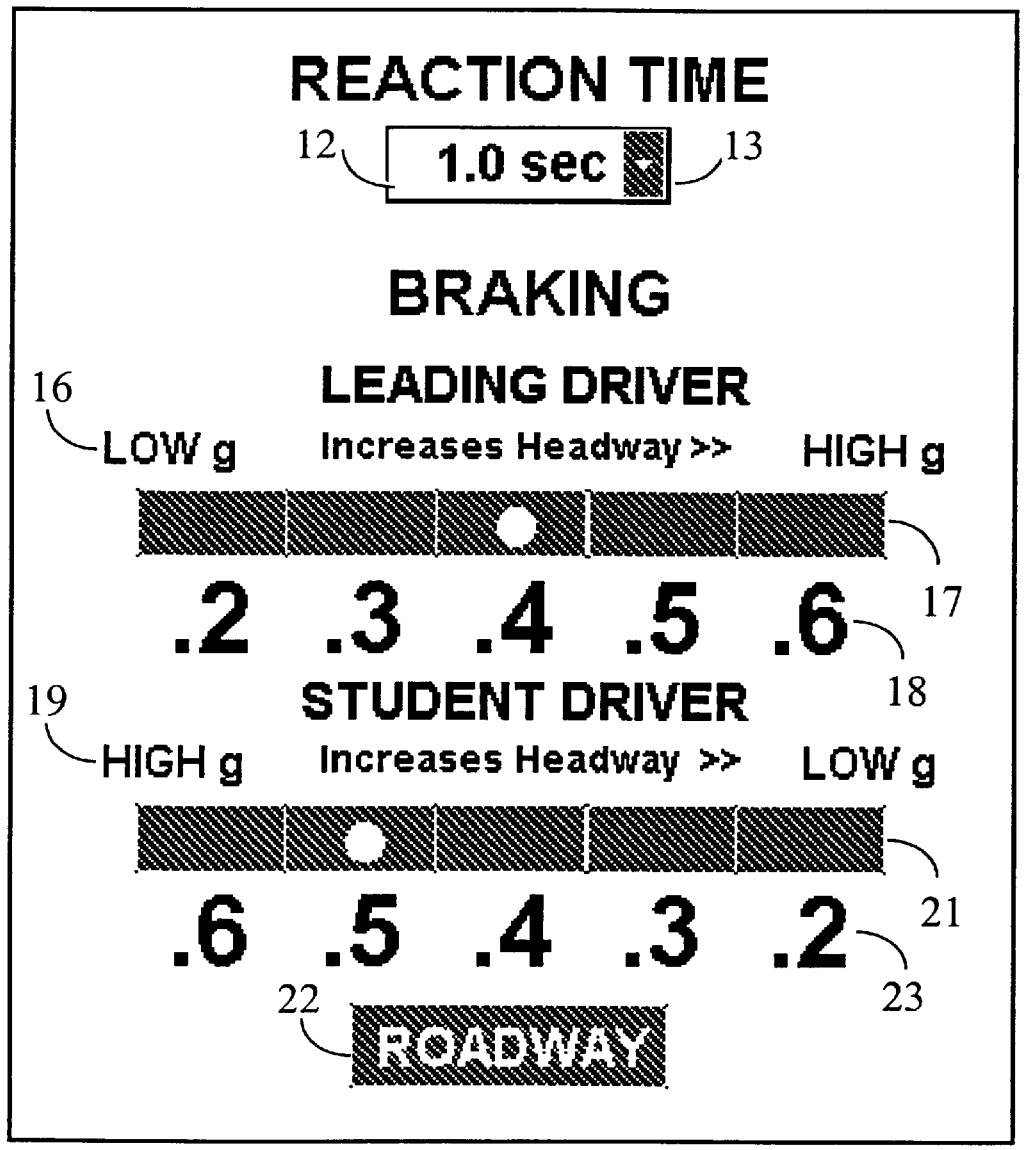
FIG. 4 illustrates the simulate form display of the present invention.

The Simulate Form display in FIG. 4 is selected from the Main Control Panel (FIG. 3). FIG. 4 shows the controls for simulating the conditions of "Driver Reaction Time", "Braking", and "Roadway Conditions". Selections are made by the instructor using the simulate display form, and can mirror actual driving conditions or illustrate the separate or combined effects of extreme conditions. Selections are used to compute the danger of headway collision warning from moment to moment, and the feedback compels the student to establish a safe headway distance appropriate to the combined simulated and actual conditions.

Reaction-time of the student can greatly affect when a headway warning is provided. Drowsiness or alcohol use can slow reaction time such that the headway distance should be longer than when the driver is alert. Pull down menu button 13 enables the instructor to select one of several reaction time delays, e.g. 0.7 sec.,1.0 sec., 1.5 sec., 1.7 sec., 2.0 sec., or 3.0 sec., which remain visible in the pull down menu window 12 until it is changed. The default reaction time setting is 1.0 sec. Pull down menu button 13 also enables the instructor to initiate a "Reaction Time Test" (FIG. 5), in place of an arbitrary value, to measure the actual reaction time of the student driver. Results of the reaction time test will then appear in the pull down menu window 12 until changed.

Figure 5:
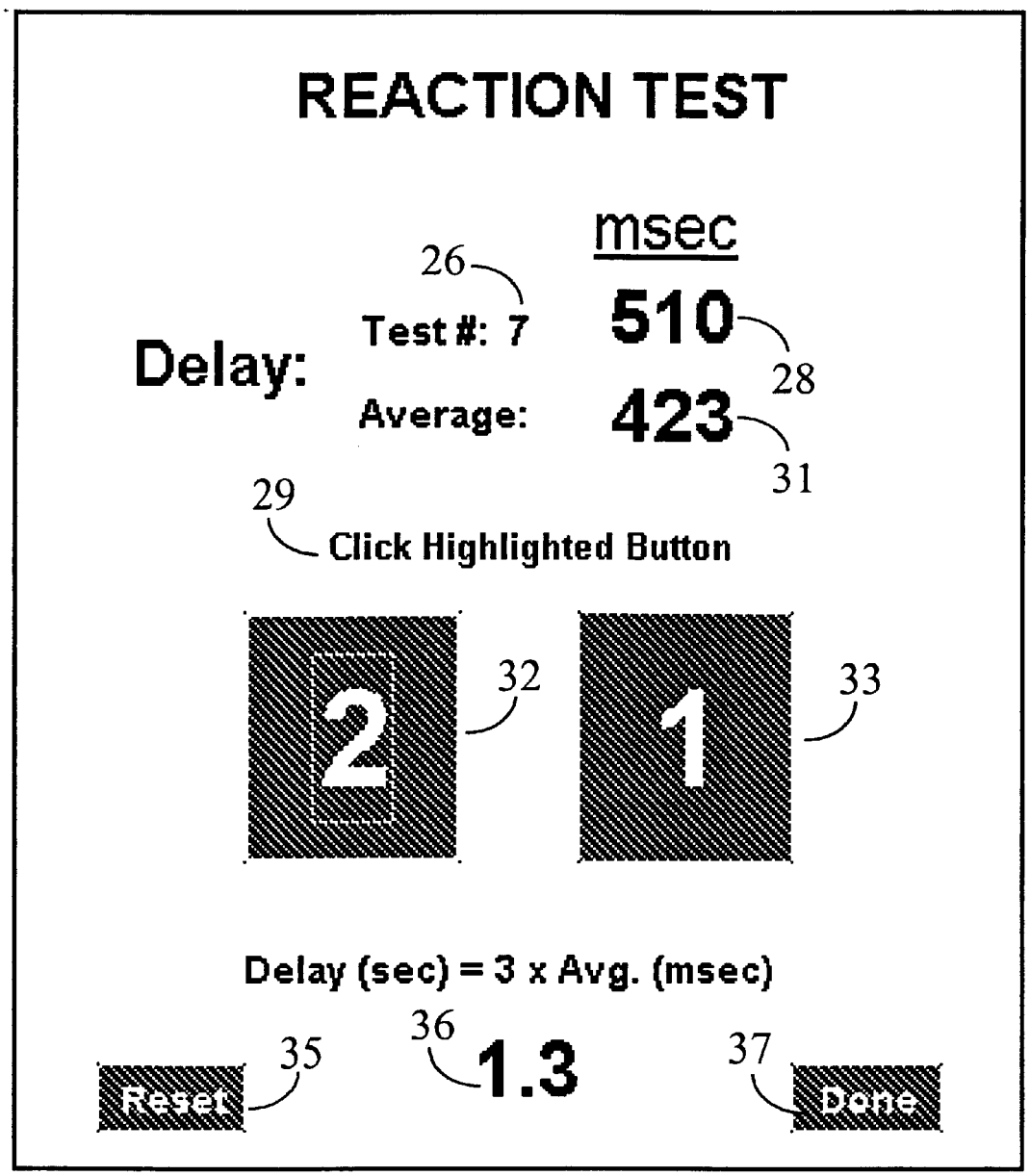
FIG. 5 illustrates the reaction time test display of the present invention.
Figure 10:
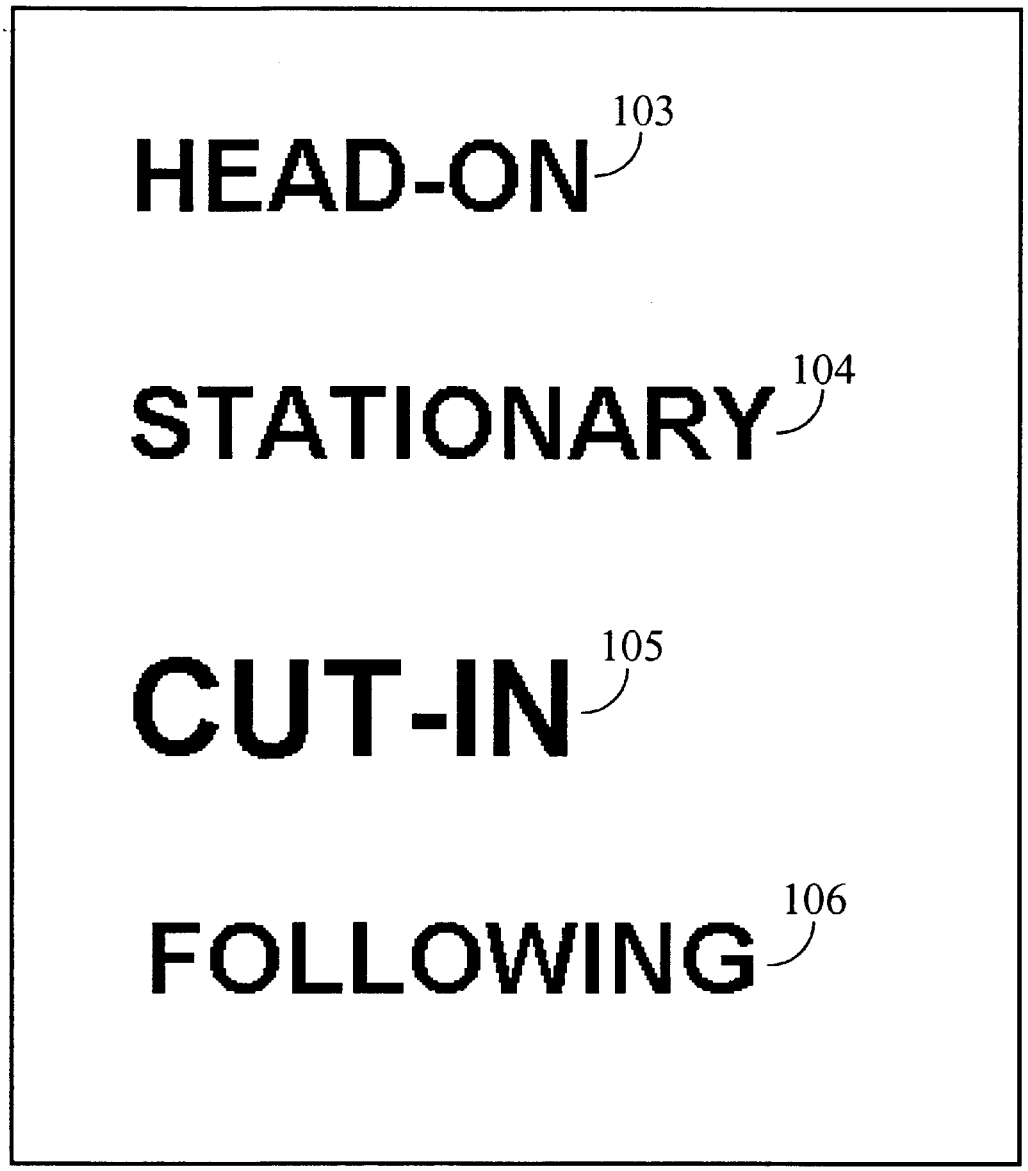
FIG. 10 illustrates the geometry form display of the present invention.

FIG. 5 shows the controls and displays to perform the student "Reaction Time Test". Reaction delay is measured in milliseconds, and the reaction time results 28 are shown for each test, identified by a numerical character in display field 26, as well as the average value 31 of all of the tests. For example, in FIG. 5, the result 28 of test #7 was 510 msec, and the average 31 of the seven tests was 423 msec. The test is performed by instructing the student, with label 29, to "click" the button display 32, 33 that is highlighted. At the beginning of each test, button 33, identified with a numeral "1", is highlighted. Button 32, identified with a numeral "2", is then automatically highlighted at random between one and five seconds, while button 33 is dimmed. Reaction time is measured from the time button 32 is highlighted until the student clicks on button 32. It will be appreciated that instead of using a mouse or keyboard to select button 32, activation may be implemented using a switch connected to the vehicle brake pedal or monitoring the vehicle's wiring for brake operation. Alternately, reaction delay can be measured in real-time by measuring the student's braking delay in response to the "Danger of Headway Collision" alarm (FIG. 10). In one working embodiment, based on the latest scientific literature, reaction time in seconds is computed as three times the average reaction time in milliseconds, and the result is displayed in field 36. The test may be restarted by selecting the "Reset" button 35, thereby returning all values to zero. The "Reaction Time Test" form is hidden by selecting the "Done" button 37, and the calculated value in field 36 is then displayed in the pull down window 12 of the simulate display of FIG. 4. The test is repeated automatically until the "Done" button is activated.

Referring back to FIG. 4, braking behavior of the leading and student drivers can also affect when a headway warning is provided. For both the leading vehicle driver and the student driver, an assumption is made about the braking force or readiness in which each driver will respond to avoid a collision. For the student driver, a low braking force will result in a longer stopping distance, and conversely a higher braking force 19 will shorten the stopping distance. First, the assumed braking force of the leading driver is selected from control array 17. In the second step, the assumed braking force of the student driver is selected from control array 21. The arrangement and operation of the displayed button arrays 17 and 21 is unique, whereby, when the braking assumption for the leading driver is first selected, there is an automatic selection of the minimum safe braking pressure the student must apply to avoid a collision. For example, if 0.4 g is selected as the expected leading driver braking force, then the displayed button for 0.5 g on control array 21 is automatically selected, as the recommended student braking force is 1/10th of a "g" greater than the force selected for the leading driver. The additional braking readiness is recommended for the student to avoid a headway collision. The displayed buttons may be color coded to indicate safe braking forces. From the recommended braking readiness, the driving instructor may incrementally increase or decrease the expected student braking readiness to illustrate, for example, how the headway warning compels a longer following distance when the student driver might be expected to brake less aggressively.

The braking behavior simulation form is also unique in that it untangles the inverse relationship between leading driver and student driver braking forces, with respect to conditions that would cause the student driver to increase headway distance. Specifically, an expected greater leading driver braking force (perhaps due to an emergency ahead of the leading driver) should compel the student driver to increase their following distance. Alternately, an expected lesser student driver braking force (from hypo-vigilance or distraction) should also compel the student driver to increase their following distance. The displayed button arrangement in FIG. 4 clarifies this unobvious relationship by showing braking forces that increase headway distance from left to right.

Figure 6:
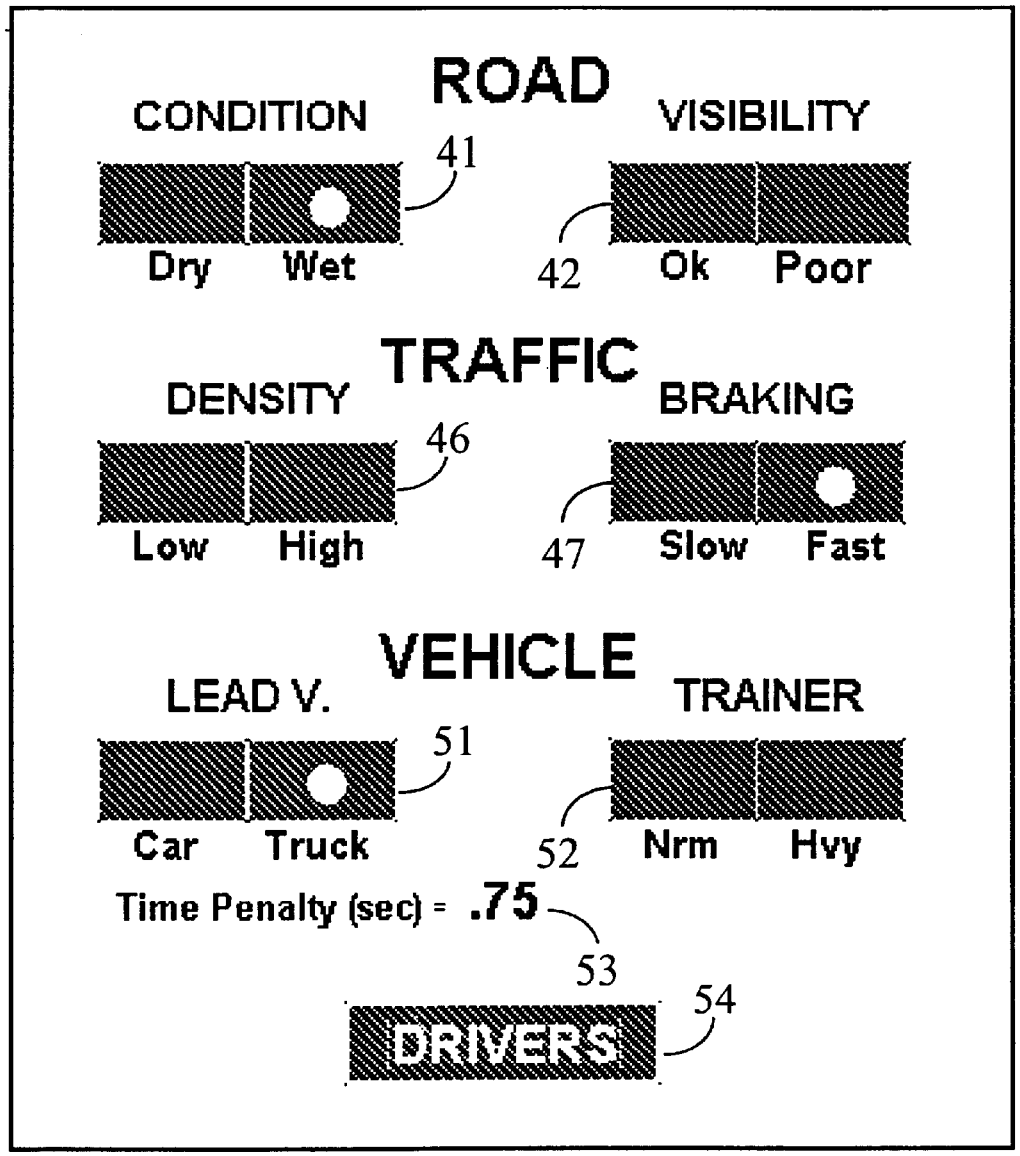
FIG. 6 illustrates the roadway conditions form display of the present invention.

Roadway conditions also greatly determine when a headway collision warning is provided. The roadway condition form, shown in FIG. 6, is displayed by selecting the displayed "Roadway" button 22 of the simulate display form (FIG. 4). Using the roadway condition form, the driving instructor selects conditions of the roadway, either to mirror actual conditions or simulate selected conditions. The selectable conditions are divided into three categories, Road, Traffic, and Vehicle conditions, each with respective displayed button arrays 41, 42, 46, 47, 51, and 52. When a particular condition is selected, the respective displayed button is highlighted. Therefore, at a glance, the instructor can visualize the total number of hazard conditions selected. It will be appreciated that other or additional roadway related conditions can be incorporated in system 300.

In the road condition category, the instructor selects the roadway surface condition as being either Dry or Wet using displayed button array 41, and road visibility is selected as being Ok or Poor using displayed button array 42. Under the traffic condition category, selections for Traffic Density as being either Low or High are made using display button array 46, and selections for Traffic Braking as being either Slow or Fast are made using display button array 47. For the vehicle condition category, selections for the Lead Vehicle as being either a Car or Truck are made using display button array 51, and selections for the Training Vehicle Weight as being either Normal or Heavy are made using display button array 52. Each selected hazard condition causes a reaction time penalty, which was selected to be 0.2 seconds in one working embodiment. The accumulated penalties result in a danger of headway collision warning that occurs when the training vehicle is at a greater distance from the leading vehicle than when less hazardous conditions are selected. The total penalty is displayed in display field 53. After all roadway conditions have been selected, the instructor returns to the main simulation form, FIG. 4, by activating the "Drivers" display button 54.

Figure 7:
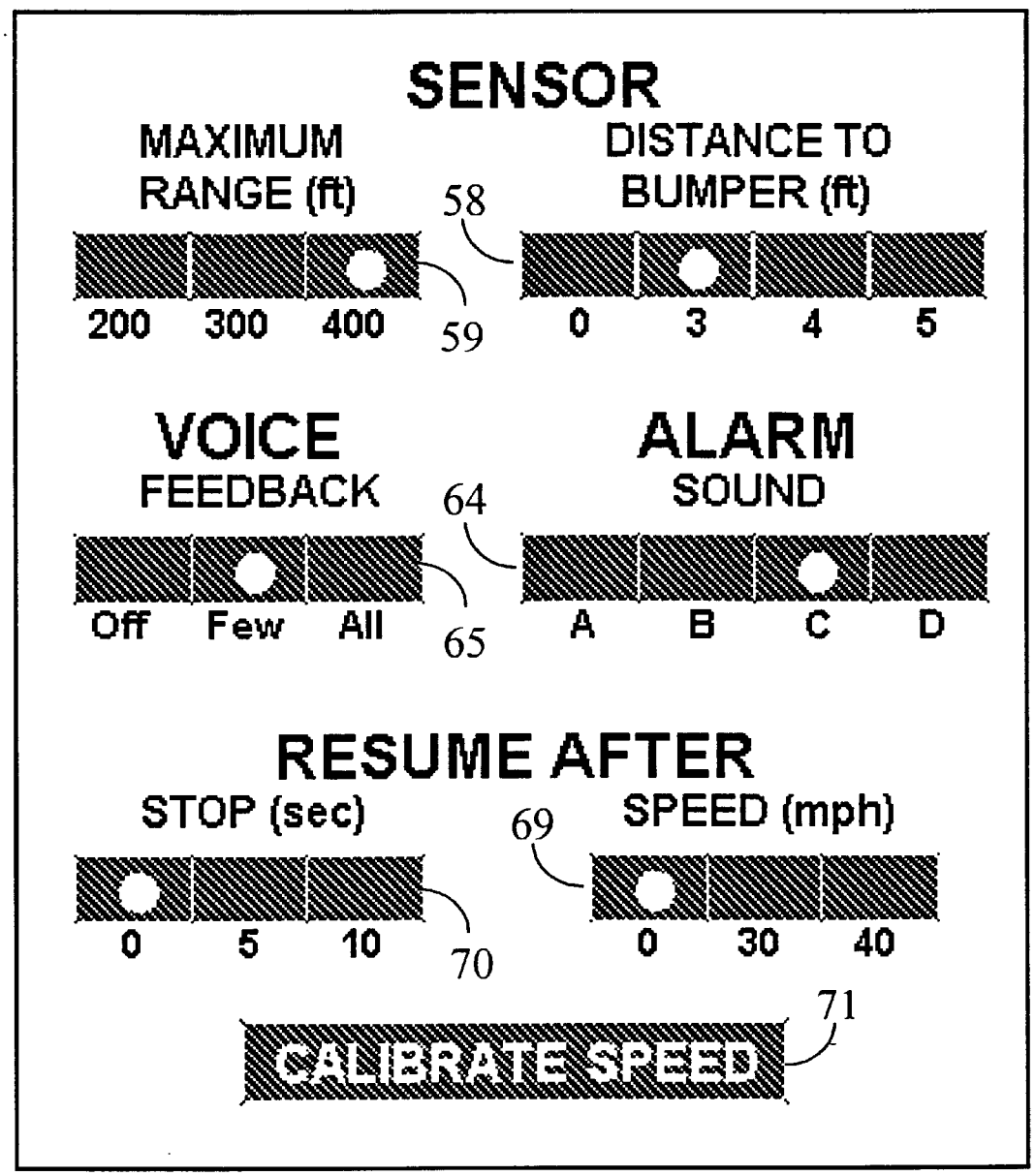
FIG. 7 illustrates the settings form display of the present invention.
Figure 8:
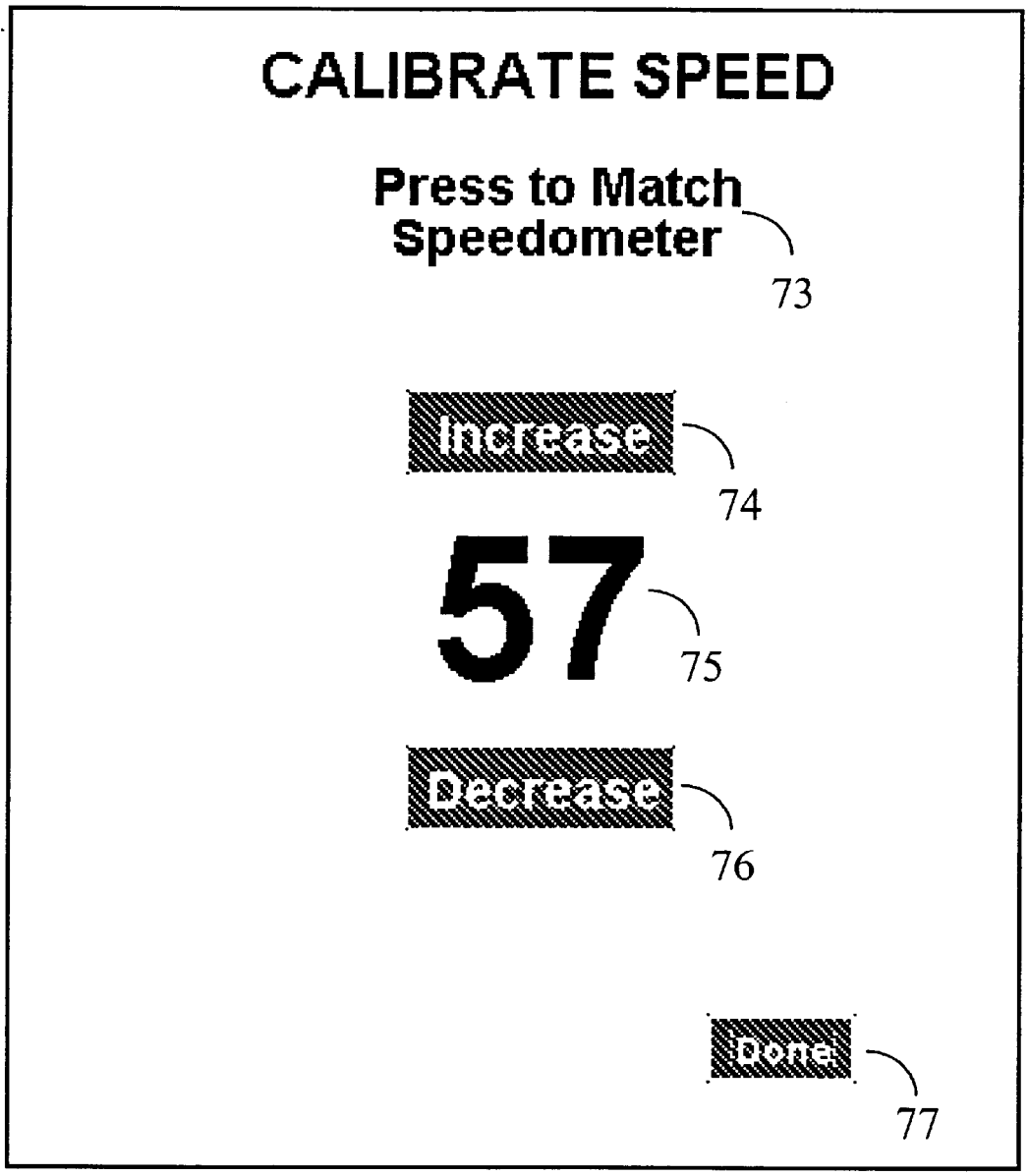
FIG. 8 illustrates calibrate speed form display of the present invention.

The Settings Form display, shown in FIG. 7, is selected from the Main Control Panel display (FIG. 3). The Settings Form display provides controls for setting sensor parameters, options for voice feedback, options for audible alarms, conditions for limiting trainer responses, and calibration of training vehicle speed. These settings uniquely provide for response adjustment of system 300 to thereby produce an unobtrusive and accurate training experience. Each selection on a display button array 58, 59, 64, 65, 69, and 70 is highlighted to indicate the desired setting. Obviously, system 300 may include additional or other settings, as well as other possible selectable values for any of the settings. For the sensor settings, a selection for "Maximum Range" may be either 200, 300, or 400 feet, using the display button array 59, and a selection for "Sensor Distance To Bumper" may be either 0, 3, 4, or 5 feet, using display button array 58. The maximum range setting excludes sensor detections beyond the selected range. Limiting the detection range can reduce nuisance alarms or unwanted detections with some sensors and traffic conditions. The sensor distance to bumper setting provides a correction value that is subtracted from the total measured distance. The subtraction provides an accurate distance measurement from the front bumper of the training vehicle to the leading vehicle, as when the sensor is mounted on the dashboard. If the sensor is mounted on the front bumper, the selection would be zero.

For setting of voice feedback, a selection of either no voice feedback, limited voice feedback, or all available voice feedback is made using display button array 65. Speech feedback in the form of prerecorded digital messages or synthetic speech is important for training student drivers, to ensure that their visual attention remains on the road. Voice feedback is used to interpret and comment on trends in the student's performance in maintaining a safe headway distance, which would be difficult for a student to ascertain visually while operating a motor vehicle. Nevertheless, the system 300 also includes special displays for the driving instructor to visually monitor and interpret headway distance maintenance trends. The user is able to select one of a plurality of tonal alarm sounds using display button array 64. The alarm sound setting is used to select a unique alarm sound for the danger-of-headway-collision warning.

Settings also provide for suspending sensor processing. These settings ensure that "nuisance" alarms will not occur while either the student establishes an appropriate headway distance during traffic startup, following a full stop, and/or until a minimum speed is attained. The amount of time sensor processing is to be suspended is computed following a full STOP until 1) a minimum speed is reached, or 2) after a selected time has elapsed. The after-stop button array 70 provides selections of 0, 5, and 10 seconds, for example, and the after-speed button array 69 may provides selections of 0, 30, and 40 mph. Both conditions may be selected, but the actual delay is the one that expires last.

The Settings Form display also provides a control for calibration of the measured training vehicle speed with the actual speed of the training vehicle. The "Calibrate Speed" display button 71 is activated to bring up the calibrate speed form, shown in FIG. 8. The calibrate speed form is displayed in the same location as the Settings form, and is hidden after the task is completed. The calibration feature is intended to be used when system 300 measures the speed of the training vehicle by detecting electrical pulses generated by the vehicle or an add-on sensor, attached to the interface unit 340, where the frequency of pulses is proportional to the vehicle's speed. However, where system 300 includes GPS receiver 380 as part of sensor system 350, no calibration is required as training vehicle is then directly sensed from satellite data. In using the Calibrate Speed Form display, the user is instructed to activate the respective display buttons 74 and 76 until the speed display 75 matches the speed indicated on the vehicle's speedometer. The display button 74 increases the value, and the display button 76 decreases the value. When the displayed speed matches the vehicle's speedometer, the user can return to the settings display by activating the "Done" display button 77.

FIG. 9 shows the Limit Alarm Form display that is selected from the Main Control Panel display (FIG. 3). The Limit Alarm Form display provides the controls and displays for setting alarm conditions for minimum following distance, minimum "following-time rule," (also called range rate or the amount of time to traverse the measured distance, FIG. 1, the time A) and maximum training vehicle speed. Additional or other limit settings for alarms may also be included in system 300. The purpose of the limit alarm training method is to provide the student with audible feedback about specific elements related to maintenance of a safe following distance. Separate audible alarms are activated for each parameter when the limit is exceeded, such that the student can easily identify which limit was exceeded. Visually, when limits are exceeded, the respective setting display 86, 88, and/or 92 is highlighted. In order to observe how close the student is to crossing a limit, the instructor can observe the displays showing the real-time measure of each parameter in the display windows 97, 98, and 99. For example, the current "distance" is shown in display window 97, the current "following time" is shown in display window 98, and the current training vehicle speed is shown in display window 99.

Setting the minimum following distance requires the instructor to adjust the minimum distance in the setting display 86 by either activating the "farther" display button 83, or by pressing the "closer" display button 93. The range of possible settings, 0 to 300 feet, is displayed by an associated label. Similarly, setting the minimum "following-time" rule requires the instructor to adjust the minimum time in the setting display 88 by either selecting the "longer" display button 87, or by selecting the "shorter" display button 95. The range of possible settings, 0.6 to 4 seconds, is displayed by an associated label. Setting the maximum driving speed limit requires the instructor to adjust the maximum speed in the setting display 92 by either activating the "faster" display button 89, or by activating the "slower" display button 96. Hereto, the range of possible settings, 0 to 70 mph, is displayed in an associated label.

The Geometry Display Form display, shown in FIG. 10., shows the display for indicating the relative motion of the leading vehicle with respect to the training vehicle. The Geometry Display form is selected from the Main Control Panel display (FIG. 3). Various geometries are detected by system 300 using sensor input and computations (FIGS. 14A–14J). Specifically, system 300 can detect the conditions for a "head-on" collision, indicated with label 103; the presence of a "stationary" leading vehicle, indicated with label 104; the condition where the leading-vehicle cuts in front of the training vehicle, indicated with label 105; and conditions of normal "following" by the training vehicle, indicated with label 106. Sensors added to system 300 may detect additional or other headway geometries that can be added to the Geometry Display Form. Also, computations may be used to automatically determine the real-time decelerations of each vehicle in addition to or in lieu of simulated decelerations selected on the simulate display of FIG. 4. Student Reaction Time may be also measured in realtime by measuring braking behavior in response to certain detected geometries, in addition to braking in response to the danger of headway collision warning as previously described regarding FIG. 5. When the geometry is detected, the student may be alerted by a speech based alarm, which identifies the geometry by name. Moreover, the driving instructor can observe the Geometry Display form, wherein a detected condition results in the associated geometry label 103, 104, 105, and 106 being highlighted and enlarged in size for the duration of the condition. The geometry display provides unique instructional feedback for teaching headway safety in the context of a moving vehicle. Geometry feedback is not only confirming to students about their experience with respect to the headway environment, but more importantly provides a warning when those conditions may result in a collision.

The Headway Time or "Following Rule" form display, shown in FIG. 11, is selected by activating the Range Rate display button of the array 5 on the Main Control Panel display in FIG. 3. The Headway Time form provides the displays and controls for indicating the measurement and history of following time. Headway Time, Following Time, Following Rule, and Range Rate are different terms for the time to traverse the measured distance between the training vehicle and leading vehicle, FIG. 1, (time period A). Driving instructors teach the "2-Second" following rule, where the student picks a landmark and counts the seconds from the time when the leading vehicle passes that landmark until the training vehicle reaches the landmark, which count should be at least 2 if the student is maintaining a sufficient 2 second following distance. System 300 computes the following time automatically, which measure is used both in the present Range Rate method and in the Limit Alarms method (FIG. 9). However, the Headway Time display provides a time history of the following time in the form of a strip chart display 116, which moves from right to left. The time history provides a method for the instructor to monitor improvement, as well as providing the context for selecting appropriate verbal feedback to the student. This method is unique for teaching headway safety in the context of a moving vehicle.

In the Headway Time display, the measured Following Time is prominently displayed in a multiple digit field 109, and a permanent instruction label 108 is provided as a reminder that the measured following time is "Ok", if the displayed following time is greater than the rule selected in the "Rule" Pull down menu 111. The default "Rule" is 1 second, however the instructor may also select 2 sec., 3 sec., 4 sec., or 5 sec., from the "Rule" Pull down menu 111. When the measured following time becomes less than the "Rule", an audible warning occurs to notify the student driver. Appropriate speech feedback then follows based on the time history of "Rule" keeping. During the time that the limit is crossed, the instructor can also observe that the digit in field 109 and the graphed line showing the time history of "Rule" keeping is highlighted with a different color, e.g. "dark red".

The history chart 116 in FIG. 11, is a strip chart that illustrates the history of following rule keeping over time. The graphed line 113 illustrates the history, and moves from right to left. The time history image is modified by selecting the number of points that appear on the graph, and the number of measures that comprise the value displayed by indicator 113. Thus, the value of every point on 113 is the mean of a selected quantity of measures or "windows". The "window" is "moving" such that the value changes as the oldest measure is discarded and the newest graph point is added. The pull down menu 112, allows the user to select the number of measures that define the moving average window. The pull down menu 112 may include selections for 1, 5, 10, 20, 30, and 40 points, for example. The pull down menu 110 provides for selection of the number of graph points displayed on chart 116, and may include selections for 10, 15, 25, 30, 35, and 40 viewable graph points. An additional indicator 114 shows the average following rule performance based simply on the values currently displayed.

In FIG. 12, the Time-To-Collision History form display is shown. The Time-To-Collision History form provides the displays and controls for indicating the measurement and history of the calculated time-to-collision. This form is selected by activating the "History" button display of the array 4 in the Main Control panel display (FIG. 3). The Time-To-Collision function is the most accurate and complex estimate of headway safety, as compared to simpler and intuitive methods such as Range Rate or Limit Alarms. The Time-To-Collision method computes the "Elements of a Headway Collision" as described with reference to FIG. 1, and determines the distance when the training vehicle could not avoid a collision if the leading vehicle were to suddenly brake to a stop. Time-To-Collision is the primary index used by system 300 for maintaining a safe headway distance, where values greater than zero represent a relatively safe following distance and values equal to or less than zero represent the relative danger of headway collision. The bar graph 8 in FIG. 3 constantly displays the Time-To-Collision values, and is computed from conditions selected using the "Simulate" method. The "History" form (FIG. 12) provides a method for the instructor to monitor improvement, as well as a means for the computer to select appropriate "context-based" verbal feedback messages for the student, and is unique for teaching headway safety in the environment of a moving vehicle.

In the Time-To-Collision History form, the calculated Time-To-Collision is prominently displayed in a multiple digit display window 119, and a permanent instruction label 118 is provided as a reminder that the displayed Time-To-Collision is safe, if it is greater than zero. When the Time-To-Collision is less than zero, an audible alarm is output to notify the student driver that the following distance is too close. Appropriate speech feedback may also be output based on the student's pattern of maintaining a relatively safe following distance (Time-To-Collision values greater than zero). During the time period that the Time-To-Collision value is less than zero, the instructor may also observe that the numeric display of the Time-To-Collision value in display window 119 and the graphed line 122 of chart 125 which are highlighted with a different color, e.g. "dark red". The "Time-To-Collision" history chart 125 is a strip chart that illustrates the history of maintaining a safe following distance, as defined by the time-to-collision function, over time. The graphed line 122 illustrates the history, and moves from right to left. The time history image is modified by selecting the number of points that appear on the graph using the pull down menu 120, and the number of measures, selected from pull down menu 121, that comprise the value displayed by indicator 122. This operates the same as the "Headway Time" graph in FIG. 11, the moving average on 122 is the mean of the selected quantity of measures from 121, which value changes as the oldest measure is discarded and the newest measure is added. The pull down menu 120 is used to select the number of graph points displayed on chart 125, and may include selections for 10, 15, 25, 30, 35, and 40 viewable graph points. The pull down menu 121 provides selections for the number of measures that comprise the moving average represented by indicator 122. Pull down menu 121 may include selections for 1, 5, 10, 20, 30, and 40 measures. An additional graph indicator 123 shows average safe following performance simply based on the values currently displayed.

The "Measures" form display, shown in FIG. 13, provides the display of lead and training vehicle speed, headway distance measures, and the cumulative number of unsafe following behaviors of the student. The Measures form display is selected by activating the "Measures" display button of array 4 on the Main Control Panel display (FIG. 3). The displayed form provides the driving instructor with a numerical summary of a few of the measures that are useful for instruction and monitoring of the student's progress over time. Specifically, measures related to vehicle Status include the current "Headway Distance" displayed in window 129, "Student Speed" displayed in window 131, and "Leading Vehicle Speed" displayed in window 133. Measures related to Student Performance include the number of violations of: "Headway Rule" displayed in field 138, "Time-To-Collision" displayed in field 140, "Maximum Speed" displayed in field 141, and "Minimum Distance" displayed in field 143. It will be appreciated that other and/or additional values may be included in the Measures form.

The operational sequences of system 300 carried out by the processing system 330 is illustrated by the flow charts shown in FIGS. 14A–14J and exemplifies one working embodiment. In this operational sequence, when power is applied to processing system 330 in step 144, the computing device of the processing system first loads the headway trainer application program. In step 145, the computer reads stored settings, which were saved automatically when the program was last terminated. The state of every selected display button from the prior use of the program is restored. In step 146 the computer initiates reading sensor data at a predetermined interval of time. The computer must be fast enough to accomplish all computational and display tasks within that predetermined interval. However, since system 300 makes extensive use of speech processing, speech feedback is executed on a different operational "thread" of the same microprocessor, using WINDOWS® based technology. Therefore, some user-interface tasks are performed independently. In step 147, it is determined whether controller 320 has provided sensor data. If no data is available on the input port, the flow passes back to step 146 to repeat the test at the next time interval. The program continues when valid data is received.

Figure 14A:
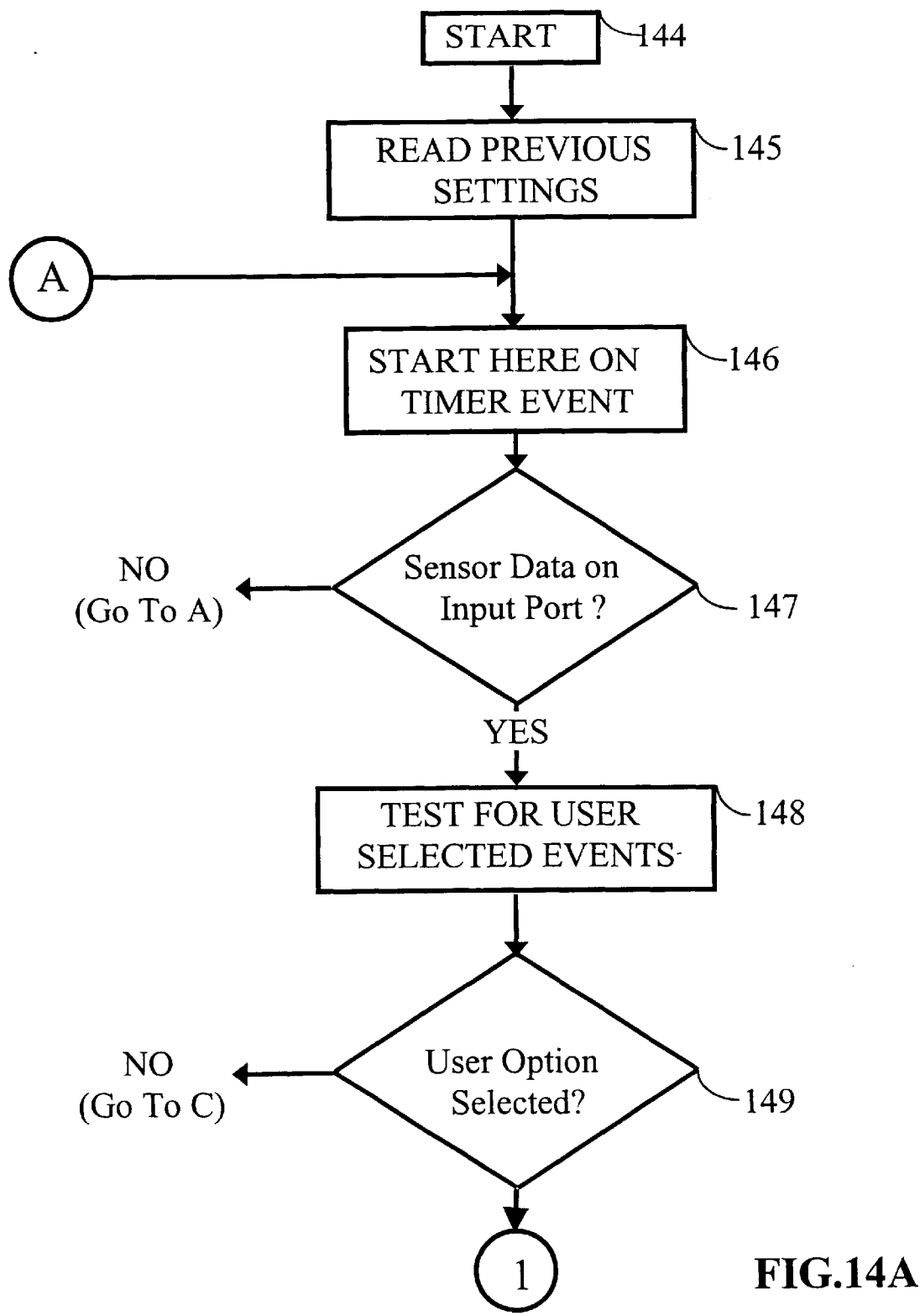
FIGS. 14A–14J are flow-charts illustrating the computational operation of the present invention.
Figure 14B:
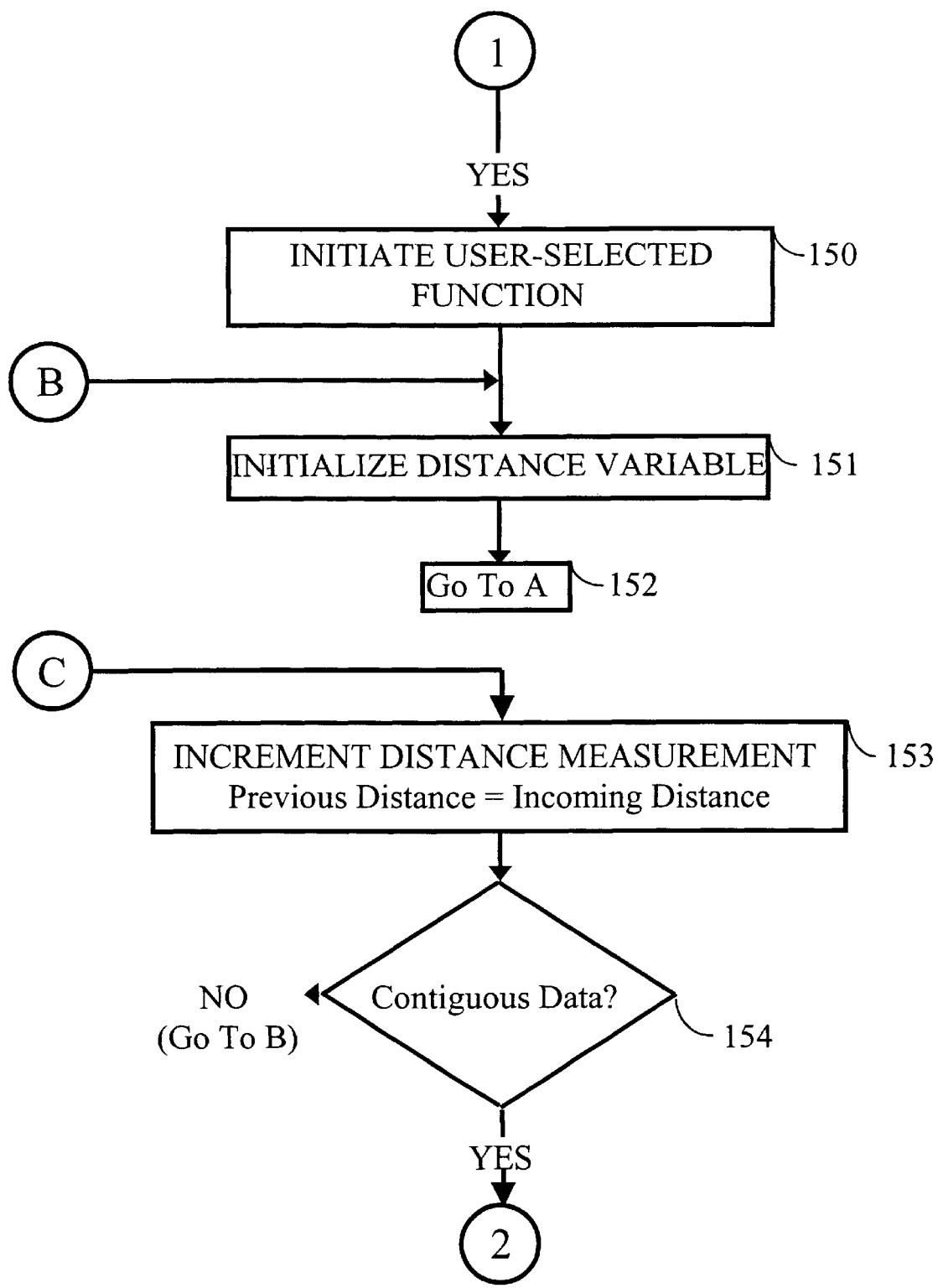
Figure 14C:
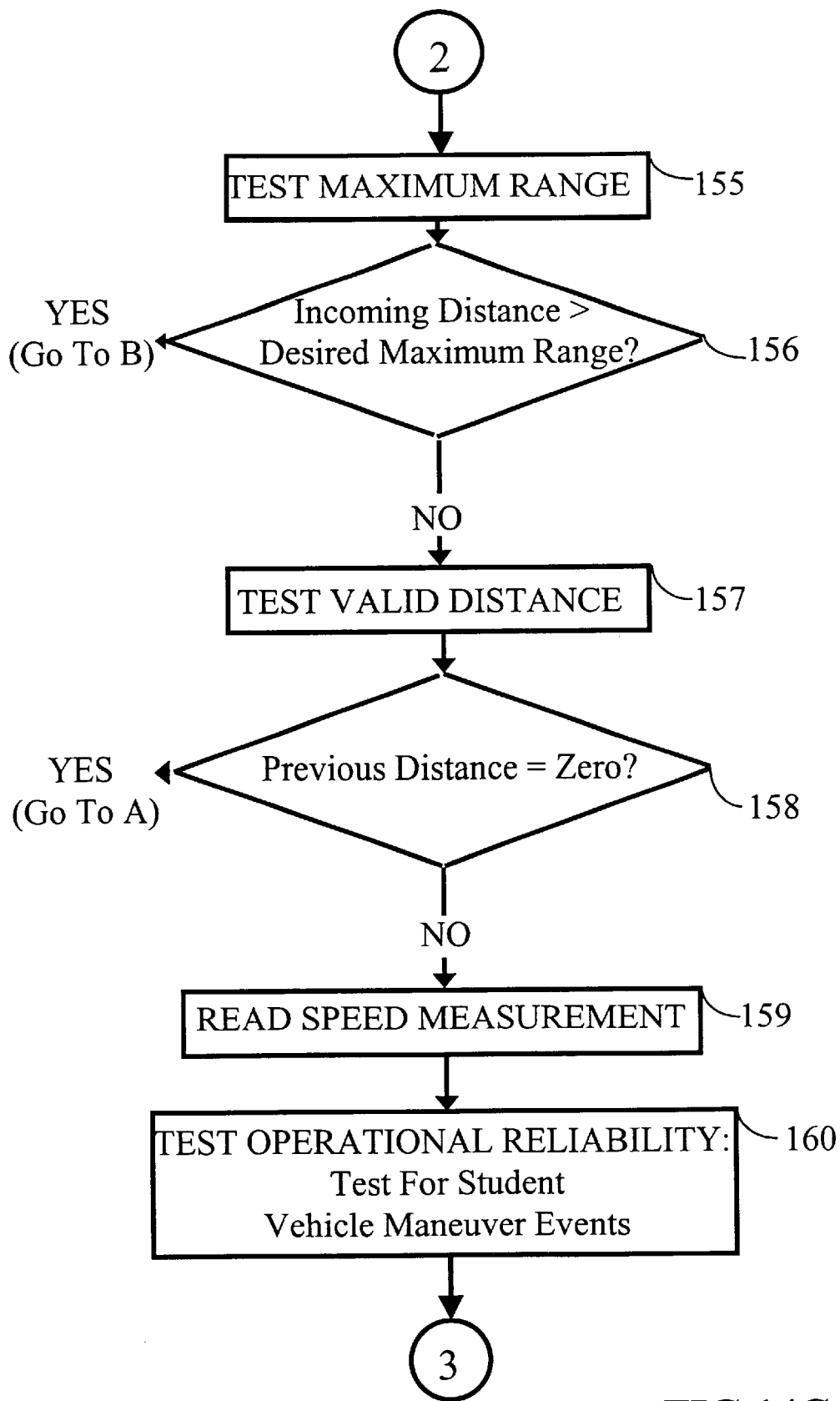
Figure 14D:
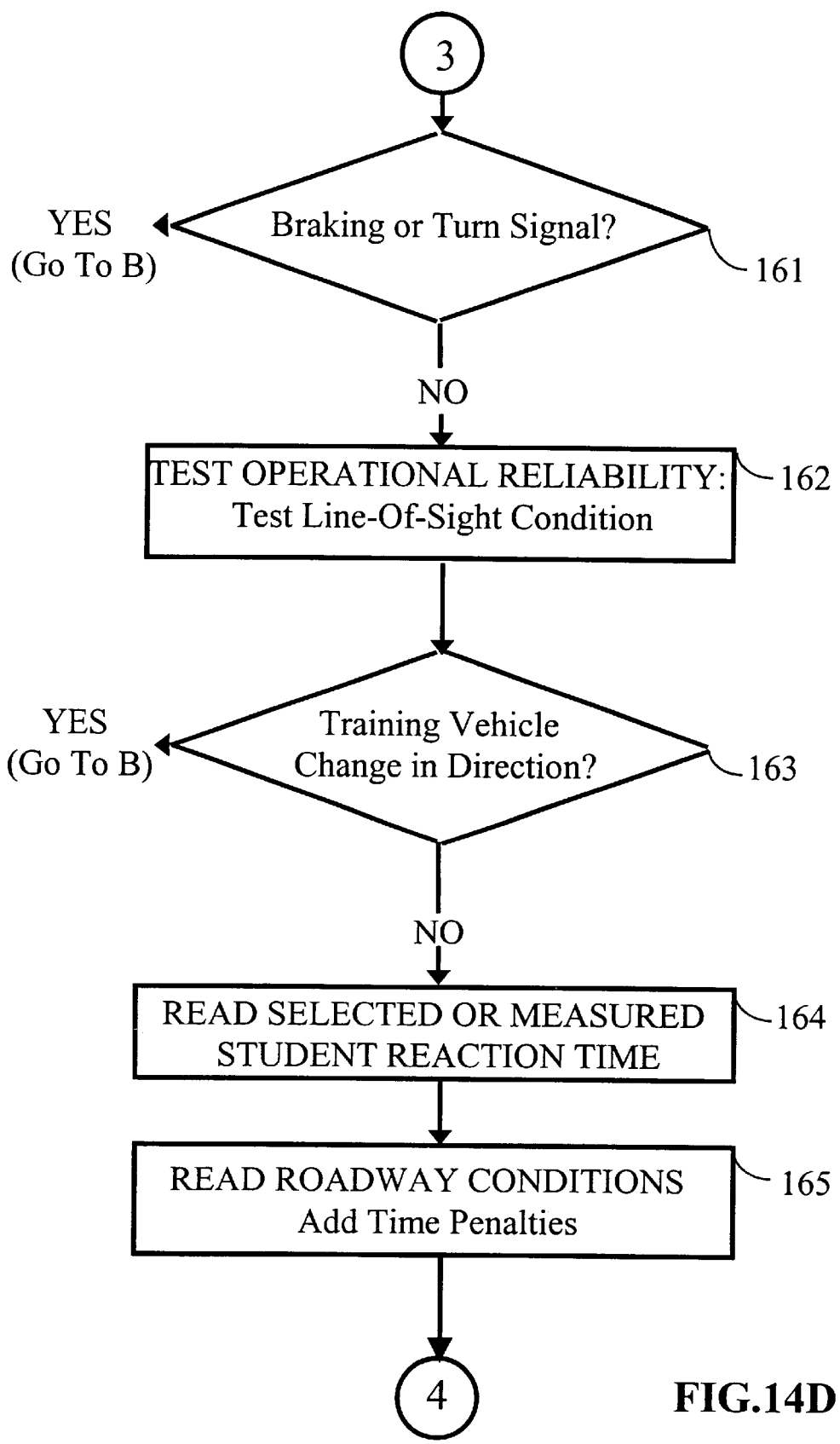
Figure 14E:
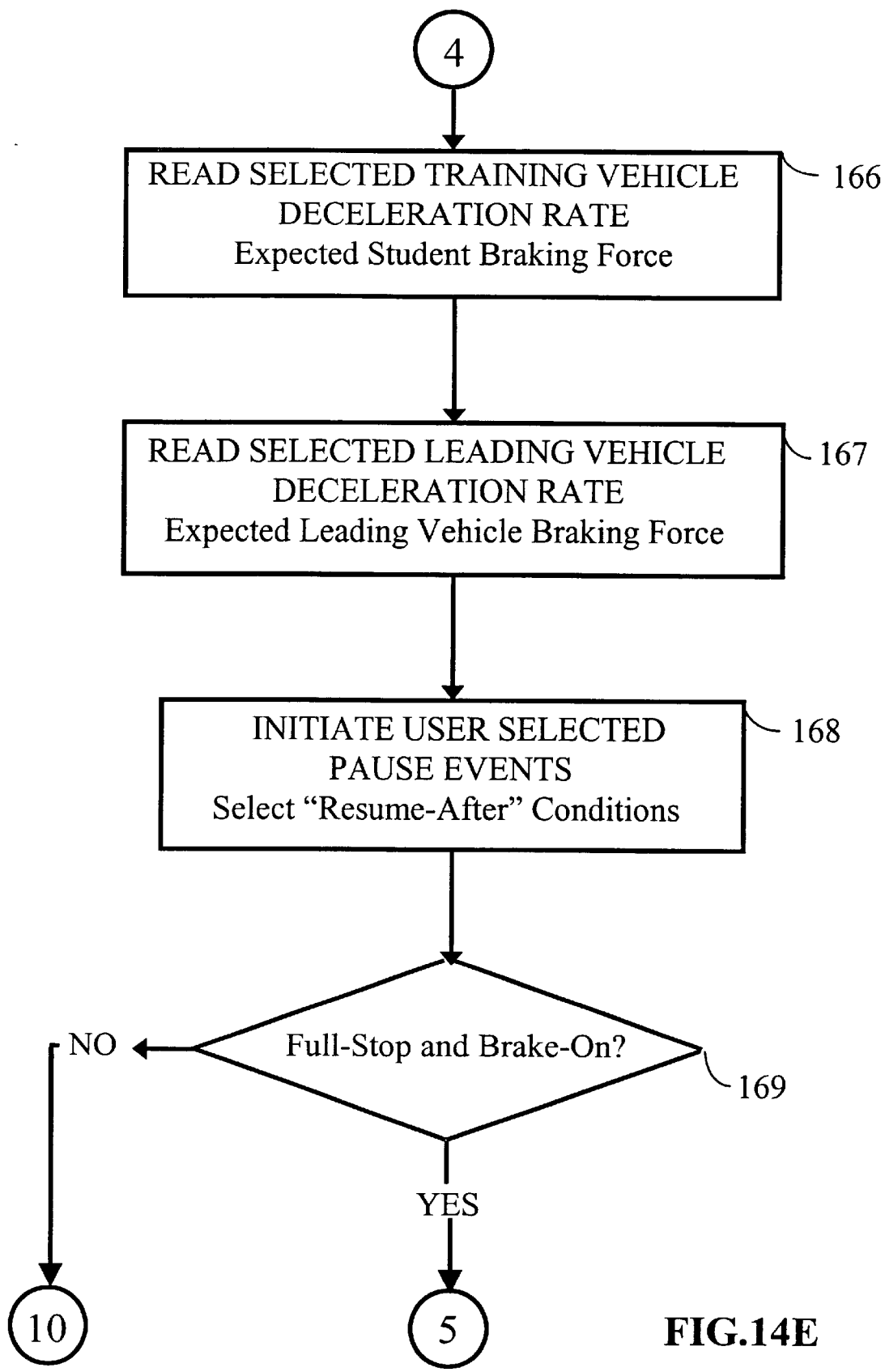
Figure 14F:
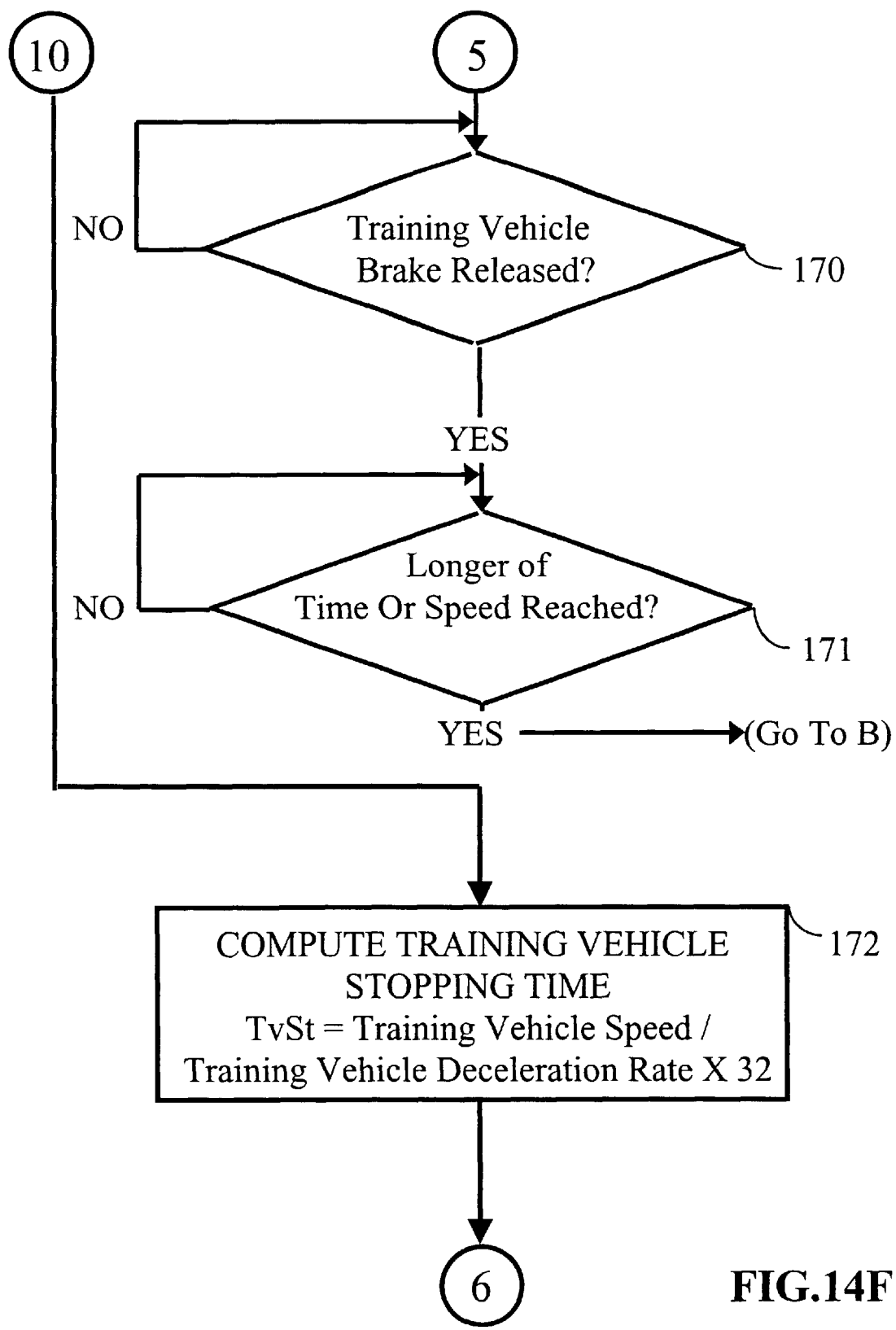
Figure 14G:
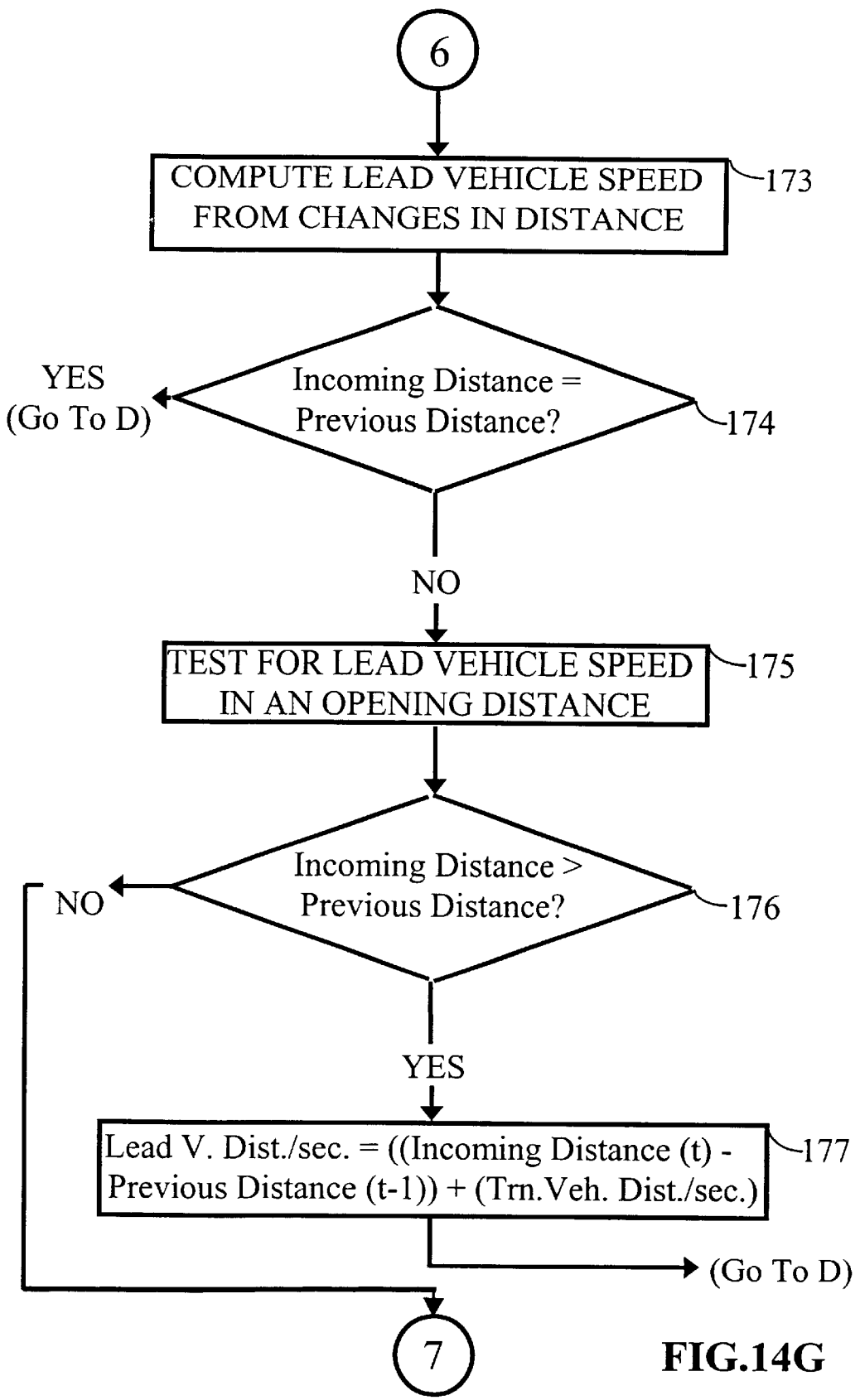
Figure 14H:
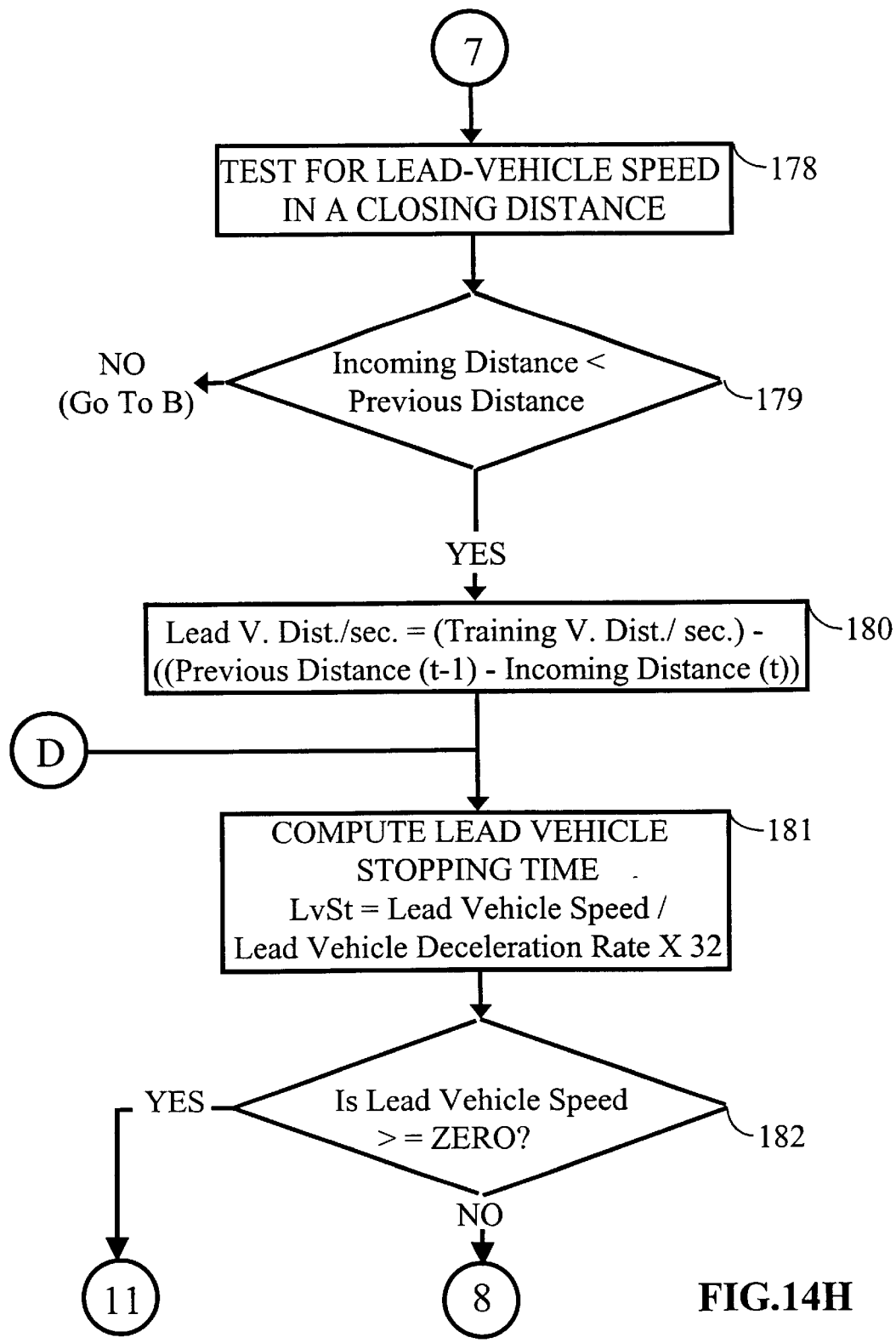
Figure 14I:
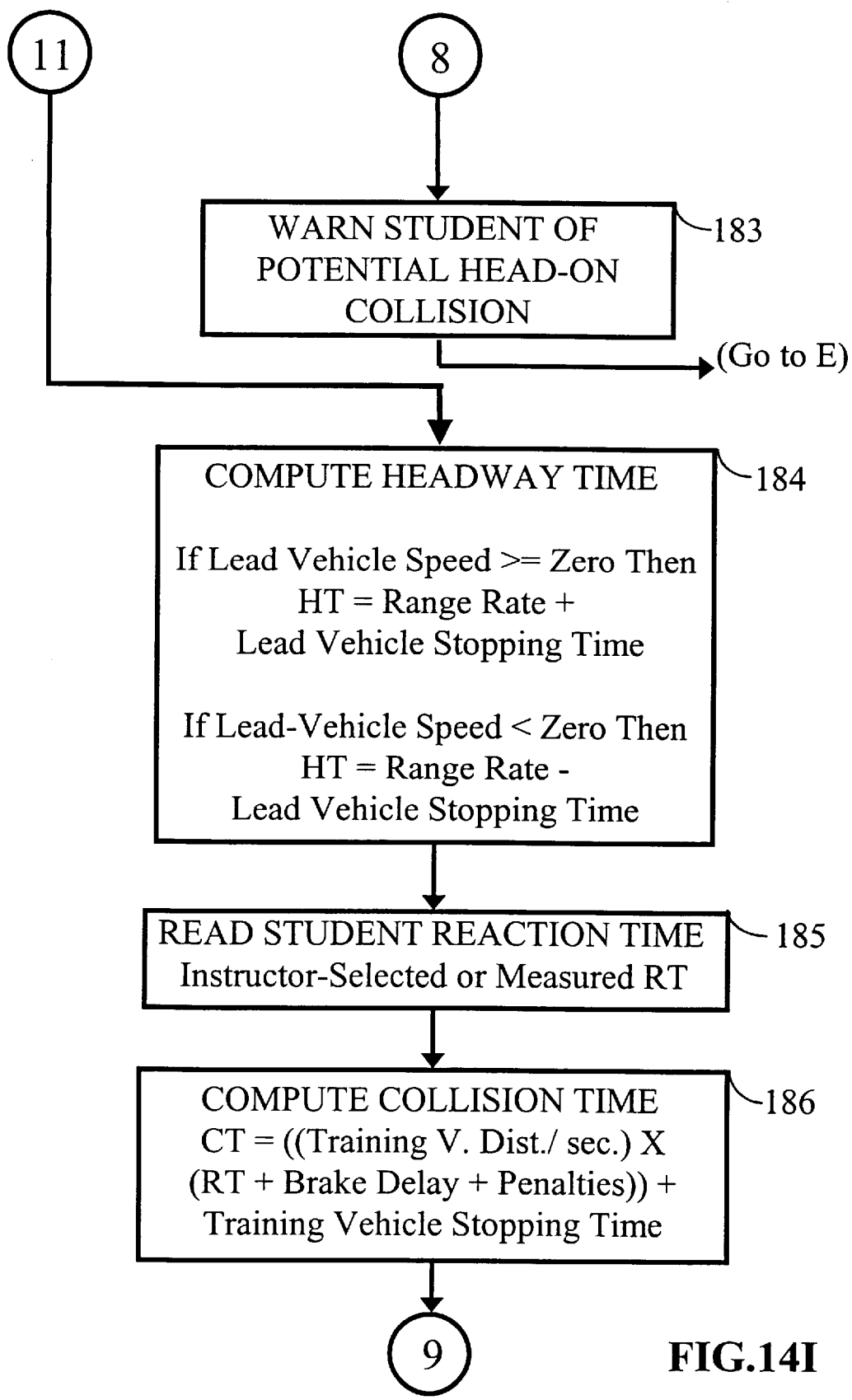
Figure 14J:
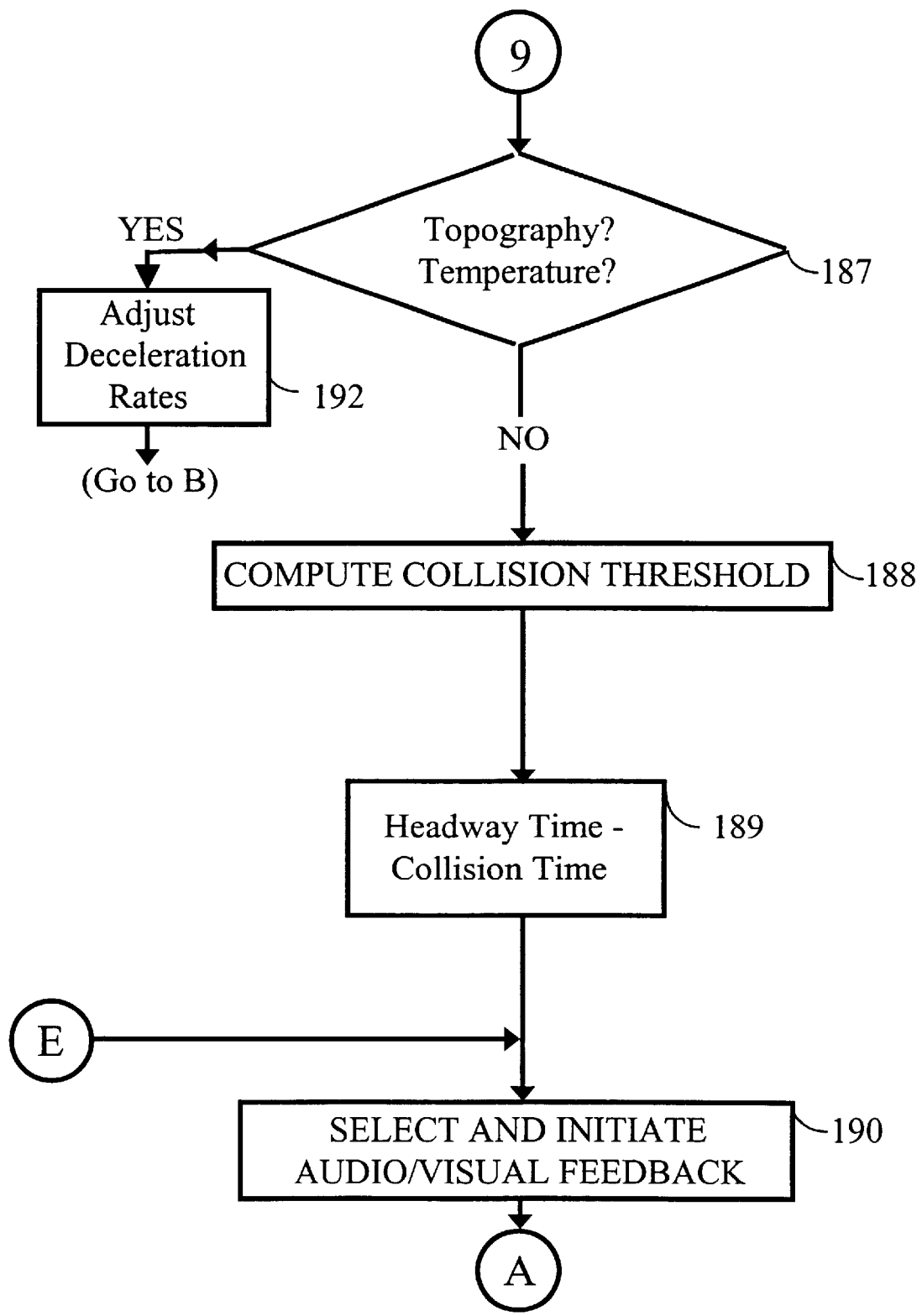

The trainer application program is written in an event-oriented language, such that there is an automatic process that checks for user-selected events like "clicking" on a displayed button. In step 148 there is a check for such user actions. If a user option is detected in decision step 149, then it is implemented in step 150 (FIG. 14B). Since most of the controls of system 300 affect the use of data, when a user action is detected, the program flow passes from step 150 to step 151 for initialization of the distance variable. The distance variable takes the value of the measured distance D, shown in FIG. 1. Following initialization, step 152 passes the flow back to block 146 to receive a new sensor datum under the changed conditions. If there is no user action detected in step 149, flow passes to step 153 where the "current" sensor data is updated. When sensor data is updated in step 153, the incoming measurement replaces the previous sensor measurement. Therefore, in order to establish relative motion, an arrangement of contiguous data is required.

In step 154 a test is made to ensure that sensor data is contiguous. Contiguous data is crucial because system 300 measures rates, i.e. changes in a measurement over time. Therefore, the interval of time between valid measurements must be exact. Thus, there must be at least two contiguous valid data points received in order for the program to continue to step 155 from decision block 154. If contiguous data is not received, flow passes back to step 151 where the data is reinitialized, and the cycle repeated until contiguous sensor readings are obtained. Steps 155 through 163 test for conditions that require the system to re-establish contiguous sensor data. In step 155, the distance measurement is tested to ensure that it is within the maximum range selected by the instructor. In decision step 156, if the sensed distance is greater than the selected maximum range, the flow returns to point step 151, where the distance measurement is re-initialized to repeat the process until contiguous measurement within the selected range is obtained. If the sensed distance is less than the selected maximum distance, the process continues to step 157 to test whether the measured distance is a valid number. In decision step 158, if the sensed distance is zero, the program returns to step 146, to await the next reading. If the sensed distance measurement is greater than zero and contiguous, the process then continues to step 159, where the sensed speed of the training vehicle is read. The combination of range and speed provide the necessary data for the calculation of "following-time" or range rate, i.e. range/speed used in subsequent computations. From step 159 the flow passes to step 160 where it is determined whether the student has initiated certain vehicle maneuvers.

Steps 160 through 163 test for other conditions that require the system to re-establish contiguous sensor data. Certain student driving actions require an interruption in measurement processing because subsequent alarms may be distracting to the student while maneuvering in traffic. For example, in decision step 161 it is determined if the student has activated a turn signal or the brakes, indicating that the student is attending to traffic conditions. Under that circumstance, the process returns to initialization block 151. Otherwise, the process continues to step 162 where a line-of sight condition is tested, as some line-of-sight sensors, e.g. laser radar, can return false measurements from roadside objects that are detected while the student negotiates a curve. Step 163 provides the determination of whether there is a rapid change in heading, which may result in a false measurement and require a return of the process to step 151. The change in direction can be determined by the GPS system or use of the vehicle's turn signals. Therefore, if braking and/or a change in heading is detected, the program returns to step 151 for a new initial distance measurement until those conditions cease to exist.

In steps 164 through 167, the selected driver, roadway, and traffic conditions provided by the instructor are read, using the "simulation" method. From block 163, the process continues to step 164, where either a selected simulated student reaction time or the results from a reaction time test is read. The process then passes to step 165, where the cumulative time penalty for selected roadway risks, e.g. wet roadway, is read. The process then passes to step 166 and then to step 167 where the deceleration or expected braking force for the student driver and leading vehicle driver, respectively, are read. A greater following distance is computed from conditions of slow student reaction time, sources of roadway risk, and a combination of the braking force expected from each driver. The process flow then passes to step 168, where selected "pause" events are read, as selected using the Settings form display. Steps 169 through 171 provide tests for instructor selected "pause" events in headway processing to prevent alarms and feedback that may distract the student while adjusting training vehicle speed to match traffic speeds and establishing a stable following distance during traffic startup. In step 169, if a full stop is not detected in step 169, flow then passes to step 172. Following the detection of a full stop in step 169, flow passes to decision block 170 where processing is delayed until the training vehicle brake is released. When the brake release is detected in step 170, the flow passes to step 171. After the longer of the delays of time or speed has been met in step 171, the process returns to step 151 to again establish contiguous sensor data.

Steps 172 through 181 compute the stopping time for the training vehicle and leading vehicle. In step 172, the stopping time is computed as the training vehicle speed divided by the expected braking force, e.g. 0.4, times 32 ft/sec$^2$. The expected student braking force used to compute stopping time is selected by the instructor using the "simulation" training method. In step 181, after the speed of the leading vehicle is computed, the stopping time of the leading vehicle is computed in the same manner as is done for the training vehicle. The instructor selects the expected leading vehicle braking force using the "simulation" training method. The process then continues to step 173. For the leading vehicle, in steps 173 through 180, speed must be computed from the training vehicle speed and the measurement of distance over time. In one working embodiment, a sample rate for distance measurements of one sample per second has been successfully used. Vehicle speed is measured in feet per second and the units of distance measurement is in feet. Therefore both measurements are conveniently used to compute the distance traversed over a standard unit of time, e.g. one second. Specifically, in decision step 174 from which flow passes from block 173, if the incoming distance equals the previous distance, then the leading vehicle speed equals the training vehicle speed and the process passes to step 181. If not, the flow passes to step 175 where it is determined if the distance between the vehicles (leading and training) is increasing or "opening" and then passes to decision block 176. If it is determined that the incoming distance is greater than the previous distance in step 176, then flow passes to step 177 where the leading vehicle speed is calculated as being equal to the training vehicle speed (feet per second) plus the difference in measured distance (feet) during the one second time increment. If step 176 is not true, then the process passes to step 178. In step 178, the distance between vehicles is tested to determine whether it is decreasing or "closing", and flow passes to decision block 179 where the test that was performed in step 176 is repeated. If the result is not true, then the process returns to step 151. If indeed the incoming distance is less than the previous distance in step 179, then the leading vehicle speed calculation in step 180 is carried out and the flow then passes to step 181. In step 180, the leading vehicle speed is calculated to be equal to the training vehicle speed (feet per second) minus the difference in measured distance (feet) during the one second time increment.

Once the stopping time or distance is computed for each vehicle, the basic measures are available to determine the relative motion of the leading vehicle with respect to the training vehicle. From step 181 the process continues to step 182. If the leading vehicle speed is zero or greater, then the process continues to step 184. If the leading vehicle speed is less than zero, the leading vehicle is either backing up or traveling towards the training vehicle, and then the flow passes to step 183 where a warning to advise the student of a potential head-on collision is issued. Other tests that use simple distance measurements to determine other motion relationships may also be incorporated in the process flow. For example, an abrupt difference in a "closing" distance indicates a cut-in by the leading vehicle, for which a warning can be output to the student. Using similar methods, the motion of the leading vehicle may also be classified as stationary or decelerating. These motion "geometries" may be indicated to the student driver through the "geometry" form display. To avoid distraction, the indications to the student occur once at the onset of the new geometry.

There are a number of techniques that can be used to compute the danger of headway collision. Using FIG. 1, the most common method compares the maximum available envelope of time within which the training vehicle can stop (headway time, times A and B in FIG. 1), with the actual time required for the training vehicle to stop (collision time, FIG. 1C). In step 184 "headway time" is calculated. If the leading vehicle speed is greater than or equal to zero, then the "headway time" is the range rate, time A in FIG. 1 (time to traverse the measured distance D in FIG. 1) plus the time required for the leading vehicle to stop, time B in FIG. 1. Alternately, if the leading vehicle speed is less than zero, then the "headway time" is the range rate minus the leading vehicle stopping time. From step 184, the process continues to step 185 where the student's reaction time is read, and then the flow passes to step 186.

Step 186 calculates the "collision time" (time C in FIG. 1) component of the danger of headway collision equation. Collision time is the maximum time required for the training vehicle to stop. Therefore, collision time is the time required for the training vehicle to stop, including the time lost due to student reaction time, the time for brakes to achieve maximum efficiency, and any time penalties from roadway risks selected from the "simulation" method. From step 186, the flow passes to decision block 187. In order to improve the safe operation of the trainer, system 300 may include sensors for automatically measuring roadway topography and temperature. Thus, in step 187, detection of predetermined roadway pitch angles indicating downhill travel may be used in step 192 to automatically increase the following distance. The recommended following distance can be increased by (a) increasing the deceleration rate selected for the leading vehicle, (b) decreasing the deceleration rate selected for the training vehicle, or (c) adding a time penalty to the computation of the collision time. Similarly, detection of low roadway temperatures, selection of "Wet" roadway conditions, and/or use of a moisture sensor to detect actual roadway moisture or icing, may be used to provide automatic adjustment in following distance to ensure safety and thus also result in the process passing to step 192. From step 192, flow passes back to step 151 In step 188, the danger of headway collision is computed by subtracting the collision time from the headway time. In step 189. if the difference is greater or equal to zero, a pre-imminent warning is issued in step 190. If the difference is less than zero, then flow the appropriate audio and/or visual feedback is initiated to warn and advise the student driver of an imminent heading collision. Thus, the danger of headway collision becomes greater as the difference of "headway time" minus collision time" extends from zero through negative numbers. Similarly, the danger becomes less as the difference extends from zero through positive numbers.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described. Certain features may be used independently of other features, and in certain cases, particular location of elements may be reversed or interposed, all without departing from the spirit or scope of the invention as defined in the appended Claims.

What is claimed is:

1. A vehicle-based headway distance training system, comprising:
   a vehicle operated by a student and accompanied by an instructor;
   a sensor system mounted to the vehicle for collection of data while said vehicle is in motion; and
   a processing system disposed in the vehicle having an input port coupled to an output of said sensor system for establishing a time to collision value responsive to data input from said sensor system and input of simulated condition values, said processing system including a data input device and a graphical display device for interaction with the instructor to input said simulated condition values and to display an indication of headway collision danger, said processing system including an audio output device for providing aural warnings to the student.

2. The vehicle-based headway distance training system as recited in claim 1 where said sensor system includes a ranging system for providing data representing a distance to an object.

3. The vehicle-based headway distance training system as recited in claim 2 where said sensor system includes a global positioning system receiver for providing vehicle position data.

4. The vehicle-based headway distance training system as recited in claim 3 where said sensor system further includes a controller for controlling the collection of said distance data and said position data and output thereof to said processing system.

5. The vehicle-based headway distance training system as recited in claim 4 where said sensor system includes a sensor for determining roadway pitch angle coupled to said controller for transmission to said processing system for use in establishing said time to collision value.

6. The vehicle-based headway distance training system as recited in claim 4 where said sensor system includes a sensor for determining roadway temperature coupled to said controller for transmission to said processing system for use in establishing said time to collision value.

7. The vehicle-based headway distance training system as recited in claim 3 where said global positioning system provides data for establishing speed and heading of said vehicle.

8. The vehicle-based headway distance training system as recited in claim 1 where said simulated condition values are selected from the group consisting of reaction time, road condition, visibility, traffic density, traffic braking rate, type of lead vehicle, lead vehicle motion geometry, training vehicle weight, and combinations thereof.

9. The vehicle-based headway distance training system as recited in claim 1 where said processing system includes a reaction time test system for measuring the student's reaction time.

10. The vehicle-based headway distance training system as recited in claim 9 where said reaction time test system includes means for measuring a time delay between display of a cue on said graphical display and input of a response from the student.

11. The vehicle-based headway distance training system as recited in claim 1 where said processing system generates a respective warning coupled to said audio output device whenever a condition selected from the group consisting of said time to collision value, vehicle speed, headway distance, headway time, and combinations thereof, is outside at least one predetermined limit values.

12. The vehicle-based headway distance training system as recited in claim 11 where said predetermined values are entered by the instructor using said data input device and said graphical display device.

13. The vehicle-based headway distance training system as recited in claim 1 where said processing system maintains a history of said time to collision values and a moving average thereof.

14. The vehicle-based headway distance training system as recited in claim 1, further comprising a vehicle interface circuit having an output coupled to said processing system and an input coupled to the vehicle's wiring for input of signals selected from the group consisting of a brake activation signal, turn signals, speedometer input signals, and combinations thereof.

15. The vehicle-based headway distance training system as recited in claim 1 wherein said sensor system includes a sensor for determining roadway pitch angle coupled to said processing system as an input for use in establishing said time to collision value.

16. The vehicle-based headway distance training system as recited in claim 1 wherein said sensor system includes a sensor for determining roadway temperature coupled to said processing system as an input for use in establishing said time to collision value.

17. A method for headway distance training, comprising the steps of:

(a) providing a vehicle with a sensor system mounted thereto, said sensor system providing data for establishing at least one parameter selected from the group consisting of headway distance, range rate, time to collision values, vehicle position, vehicle speed, roadway inclination, and roadway temperature;

(b) establishing a reaction time value for a driver of said vehicle;

(c) establishing values for simulated conditions, wherein said values for simulated conditions is input by an instructor accompanied with said driver of said vehicle;

(d) establishing a time to collision value and periodically updating said time to collision value;

(e) establishing a minimum time to collision value limit; and (f) generating an audio warning when said time to collision value equals or falls below said time to collision value limit.

18. The method as recited in claim 17 where the step of establishing a reaction time value includes the step of performing a test to establish reaction time value.

19. The method as recited in claim 17 where the step of establishing values for simulated conditions are selected from the group consisting of road condition, visibility, traffic density, traffic braking rate, type of lead vehicle, lead vehicle motion geometry, training vehicle weight, and combination thereof.

20. The method as recited in claim 17 where the step of establishing a time to collision value includes the step of establishing a time to collision value history for selectable display on a graphical display device disposed in said vehicle.

* * * * *